(12) United States Patent
Ji et al.

(10) Patent No.: US 12,547,345 B2
(45) Date of Patent: Feb. 10, 2026

(54) STORAGE SYSTEM AND COMPUTING SYSTEM COMPRISING THE SAME

(71) Applicant: SAMSUNG ELECTRONICS CO., LTD., Suwon-si (KR)

(72) Inventors: Soo-Young Ji, Suwon-si (KR); Seo-Hyun Shin, Suwon-si (KR); Hyun Joon Yoo, Suwon-si (KR); Seung Han Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/649,187

(22) Filed: Apr. 29, 2024

(65) Prior Publication Data
US 2025/0028482 A1   Jan. 23, 2025

(30) Foreign Application Priority Data
Jul. 17, 2023   (KR) .................. 10-2023-0092308

(51) Int. Cl.
*G06F 3/06* (2006.01)
*G06F 13/42* (2006.01)

(52) U.S. Cl.
CPC ............ *G06F 3/0659* (2013.01); *G06F 3/061* (2013.01); *G06F 3/0679* (2013.01); *G06F 13/4221* (2013.01); *G06F 2213/0026* (2013.01)

(58) Field of Classification Search
CPC ...... G06F 3/0659; G06F 3/061; G06F 3/0679; G06F 13/4221; G06F 2213/0026; G06F 3/0688; G06F 13/1668
See application file for complete search history.

(56) References Cited

U.S. PATENT DOCUMENTS

| | | | |
|---|---|---|---|
| 7,389,393 B1 * | 6/2008 | Karr | G06F 3/067 711/156 |
| 11,269,538 B2 | 3/2022 | Oh | |
| 11,289,137 B2 | 3/2022 | Pawlowski | |
| 2004/0024917 A1 * | 2/2004 | Kennedy | G06F 8/65 710/1 |
| 2011/0202743 A1 * | 8/2011 | Kaneda | G06F 3/0608 711/170 |

(Continued)

FOREIGN PATENT DOCUMENTS

CN   115129260 A   9/2022

*Primary Examiner* — Nanci N Wong
(74) *Attorney, Agent, or Firm* — Sughrue Mion, PLLC

(57) ABSTRACT

A storage system includes: a first device connected to a host through an interface including a first and second switches; and a second device connected to the host through the interface. The first device includes: a first controller; a first memory; and a first shared memory including information about a first degradation of the first memory. The second device includes: a second controller; a second memory; and a second shared memory including information about a second degradation of the second memory, the second shared memory being accessible by the first controller through the first switch, and wherein the first controller is configured to: receive a command related to an operation of the first memory from the host, and control the second controller to perform the command, instead of the first controller, based on identifying that the first degradation is higher than the second degradation.

19 Claims, 22 Drawing Sheets

(56) References Cited

U.S. PATENT DOCUMENTS

| | | | |
|---|---|---|---|
| 2015/0364162 A1* | 12/2015 | D'Abreu | G11C 7/1075 |
| | | | 711/149 |
| 2016/0026397 A1* | 1/2016 | Nishikido | G06F 11/2094 |
| | | | 711/162 |
| 2019/0138246 A1* | 5/2019 | Lee | G06F 13/16 |
| 2020/0050385 A1 | 2/2020 | Furey et al. | |
| 2021/0311767 A1 | 10/2021 | Oh | |
| 2022/0308769 A1 | 9/2022 | Muthiah et al. | |
| 2023/0013798 A1 | 1/2023 | Reddy et al. | |
| 2023/0076985 A1* | 3/2023 | Surianarayanan | G06F 3/0604 |
| 2023/0136664 A1* | 5/2023 | Park | G06F 3/0625 |
| | | | 711/103 |
| 2024/0046973 A1* | 2/2024 | Jin | G11C 5/143 |
| 2024/0264957 A1* | 8/2024 | Jung | G06F 12/0246 |
| 2024/0338330 A1* | 10/2024 | Hong | G06F 13/1673 |

* cited by examiner

STORAGE SYSTEM AND COMPUTING SYSTEM COMPRISING THE SAME

CROSS-REFERENCE TO RELATED APPLICATION

This application is based on and claims priority under 35 U.S.C. § 119 to Korean Patent Application No. 10-2023-0092308, filed on Jul. 17, 2023, in the Korean Intellectual Property Office, the disclosure of which is incorporated by reference herein in its entirety.

BACKGROUND

1. Technical Field

The disclosure relates to a storage system and a computing system including the same.

2. Description of the Related Art

With the development of technologies such as artificial intelligence (AI), big data, and edge computing, large amounts of data need to be processed faster in an electronic device. That is, high-bandwidth applications performing complex computations require faster data processing and more efficient memory access.

However, because most host devices, including computing units such as a central processing unit (CPU) and a graphic processing unit (GPU), are connected to a semiconductor device including a memory, for example, through a peripheral component interconnect express (PCIe) protocol, the host devices have a relatively low bandwidth and a long latency, and thus, problems of memory sharing and consistency with the semiconductor device occur.

SUMMARY

Provided are a storage system having improved reliability and a computing system having improved reliability.

Aspects of the disclosure are not restricted to the one set forth herein. The above and other aspects of the disclosure will become more apparent to one of ordinary skill in the art to which the disclosure pertains by referencing the detailed description of the disclosure given below.

According to an aspect of the disclosure, a storage system includes: a first CXL storage device configured to be connected to a host through a compute express link (CXL) interface including a first CXL switch and a second CXL switch; and a second CXL storage device configured to be connected to the host through the CXL interface, wherein the first CXL storage device includes: a first CXL storage controller; a first non-volatile memory controlled by the first CXL storage controller; and a first shared memory including information about a first degree of degradation of the first non-volatile memory, wherein the second CXL storage device includes: a second CXL storage controller; a second non-volatile memory controlled by the second CXL storage controller; and a second shared memory including information about a second degree of degradation of the second non-volatile memory, the second shared memory being accessible by the first CXL storage controller through the first CXL switch, and wherein the first CXL storage controller is configured to: receive a command related to an operation of the first non-volatile memory from the host, and control the second CXL storage controller to perform the command without performing the command by the first CXL storage controller, based on identifying that the first degree of degradation is higher than the second degree of degradation.

According to an aspect of the disclosure, a storage system includes: a first compute express link (CXL) storage device configured to be connected to a host through a CXL interface; and a second CXL storage device configured to be connected to the host through the CXL interface, wherein the first CXL storage device includes: a first CXL storage controller; a first non-volatile memory controlled by the first CXL storage controller; and a first shared memory including information about a first degree of degradation of the first non-volatile memory, wherein the second CXL storage device includes: a second CXL storage controller; a second non-volatile memory controlled by the second CXL storage controller; and a second shared memory including information about a second degree of degradation of the second non-volatile memory, the second shared memory being accessible by the first CXL storage controller through the CXL interface, and wherein the first CXL storage controller is configured to: receive a command related to an operation of the first non-volatile memory from the host, and control the second CXL storage controller to perform the command based on identifying that the command is not processed in the first CXL storage device.

According to an aspect of the disclosure, a computing system includes: a host; and a storage system including a first compute express link (CXL) storage device and a second CXL storage device configured to be connected to the host through a CXL interface, wherein the first CXL storage device includes: a first CXL storage controller; a first non-volatile memory controlled by the first CXL storage controller; and a first shared memory including information about a first degree of degradation of the first non-volatile memory, wherein the second CXL storage device includes: a second CXL storage controller; a second non-volatile memory controlled by the second CXL storage controller; and a second shared memory including information about a second degree of degradation of the second non-volatile memory, the second shared memory being accessible by the first CXL storage controller through the CXL interface, and wherein the first CXL storage controller is configured to: receive a command related to an operation of the first non-volatile memory from the host, and control the second CXL storage controller to perform the command without performing the command by the first CXL storage controller, based on identifying that the first degree of degradation is higher than the second degree of degradation.

The effects of the disclosure are not limited to those described above, and other effects of the disclosure will be apparent from the following description.

BRIEF DESCRIPTION OF DRAWINGS

The above and other aspects and features of the disclosure will become more apparent by describing in detail exemplary embodiments thereof with reference to the attached drawings, in which.

DETAILED DESCRIPTION

Figure 1:
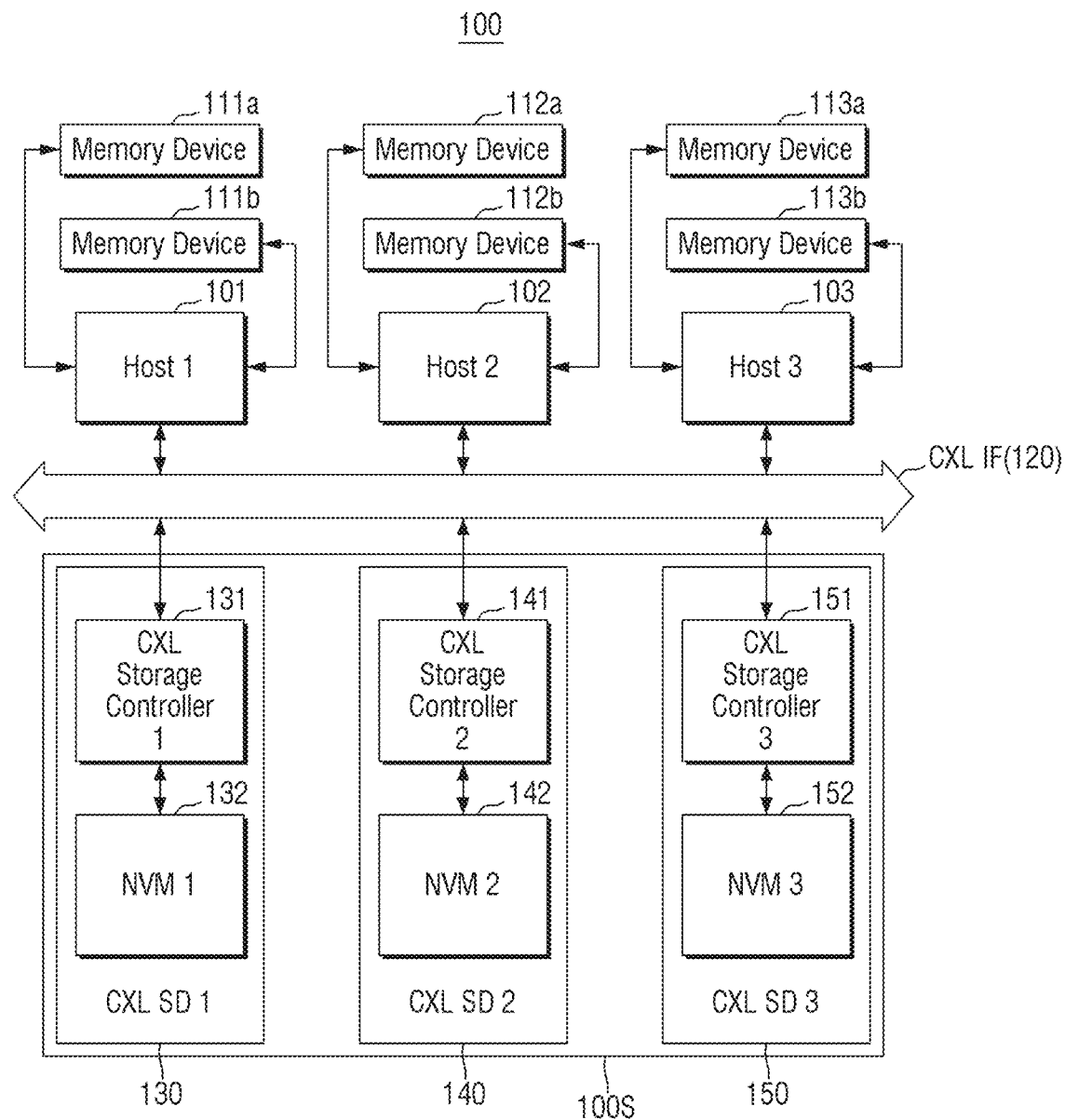
FIG. 1 is an exemplary diagram for explaining a computing system to which a storage system according to some embodiments is applied.

The description merely illustrates the principles of the disclosure. Those skilled in the art will be able to devise one or more arrangements that, although not explicitly described herein, embody the principles of the disclosure. Furthermore, all examples recited herein are principally intended expressly to be only for explanatory purposes to help the reader in understanding the principles of the disclosure and the concepts contributed by the inventor to furthering the art and are to be construed as being without limitation to such specifically recited examples and conditions. Moreover, all statements herein reciting principles, aspects, and embodiments of the disclosure, as well as specific examples thereof, are intended to encompass equivalents thereof.

Terms used in the present disclosure are used only to describe a specific embodiment, and may not be intended to limit the scope of another embodiment. A singular expression may include a plural expression unless it is clearly meant differently in the context. The terms used herein, including a technical or scientific term, may have the same meaning as generally understood by a person having ordinary knowledge in the technical field described in the present disclosure. Terms defined in a general dictionary among the terms used in the present disclosure may be interpreted with the same or similar meaning as a contextual meaning of related technology, and unless clearly defined in the present disclosure, it is not interpreted in an ideal or excessively formal meaning. In some cases, even terms defined in the present disclosure cannot be interpreted to exclude embodiments of the disclosure.

In one or more embodiments of the disclosure described below, a hardware approach is described as an example. However, since the one or more embodiments of the disclosure include technology that uses both hardware and software, the various embodiments of the present disclosure do not exclude a software-based approach.

In addition, in the disclosure, in order to determine whether a specific condition is satisfied or fulfilled, an expression of more than or less than may be used, but this is only a description for expressing an example, and does not exclude description of more than or equal to or less than or equal to. A condition described as 'more than or equal to' may be replaced with 'more than', a condition described as 'less than or equal to' may be replaced with 'less than', and a condition described as 'more than or equal to and less than' may be replaced with 'more than and less than or equal to'. In addition, hereinafter, 'A' to 'B' means at least one of elements from A (including A) and to B (including B).

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. The expression "at least one of a, b, or c" may indicate only a, only b, only c, both a and b, both a and c, both b and c, all of a, b, and c, or variations thereof. Similarly, the term "set" means one or more. Accordingly, the set of items may be a single item or a collection of two or more items.

A storage system and a computing system including the same according to some embodiments will be described below with reference to the accompanying drawings.

FIG. 1 is an exemplary diagram for explaining a computing system to which a storage system according to some embodiments is applied.

Referring to FIG. 1, a computing system 100 may include hosts 101, 102 and 103, a plurality of memory devices 111a, 111b, 112a, 112b, 113a and 113b, and a plurality of CXL storage devices 130, 140 and 150 ("CXL SD 1", "CXL SD2", and "CXL SD3", respectively). The plurality of CXL storage devices 130, 140 and 150 may constitute a storage system 100s. In some embodiments, the computing system 100 may be included in user devices such as a personal computer, a laptop computer, a server, a media player, and a digital camera, or vehicle devices (such as a navigation, a black box, and a vehicle electronic device). In some embodiments, the computing system 100 may be a mobile system such as a mobile phone, a smart phone, a tablet pc (personal computer), a wearable device, a healthcare device or an Internet-of-things (IOT) device.

The hosts 101, 102 and 103 may control general operations of the computing system 100. In some embodiments, the hosts 101, 102 and 103 may be one of various processors such as a central processing unit (CPU), a graphics processing unit (GPU), an neural processing unit (NPU), and a data processing unit (DPU). In some embodiments, the hosts 101, 102 and 103 may each include a single-core processor or a multi-core processor.

The plurality of memory devices 111a, 111b, 112a, 112b, 113a and 113b may be used as a main memory or a system memory of the computing system 100. In some embodiments, the memory devices 111a and 111b may be connected to the host 101; the memory devices 112a and 112b may be connected to the host 102; and the memory devices 113a and 113b may be connected to the host 103. In some embodiments, each of the plurality of memory devices 111a, 111b, 112a, 112b, 113a and 113b may be a dynamic random access memory (DRAM) device, and may have a form factor of a dual in-line memory module (DIMM). However, the embodiments are not limited thereto, and the plurality of memory devices 111a, 111b, 112a, 112b, 113a and 113b may include a non-volatile memory such as a flash memory, a phase change RAM (PRAM), a resistive ram (RRAM), and a magnetic ram (MRAM).

The memory devices 111a and 111b may communicate directly with the host 101 through a double data rate (DDR) interface, the memory devices 112a and 112b may communicate directly with the host 102 through the DDR interface, and the memory devices 113a and 113b may communicate directly with the host 103 through the DDR interface. In some embodiments, the hosts 101, 102 and 103 may each include memory controllers configured to control the plurality of memory devices 111a, 111b, 112a, 112b, 113a and 113b, respectively. However, the embodiments are not limited thereto, and the plurality of memory devices 111a, 111b, 112a, 112b, 113a and 113b may communicate with each of the hosts 101, 102 and 103 through various interfaces.

The plurality of CXL storage devices 130, 140 and 150 may include CXL storage controllers 131, 141 and 151 and non-volatile memories (NVM 1, NVM 2, NVM 3) 132, 142 and 152, respectively. Each of the CXL storage controller 131, 141 and 151 may store data in each of the non-volatile memories 132, 142 and 152 or may transmit data stored in each of the non-volatile memories 132, 142 and 152 to the hosts 101, 102 and 103, for example, under the control of the hosts 101, 102 and 103. In some embodiments, the non-volatile memories 132, 142 and 152 may be, but not limited to, a NAND flash memory.

In some embodiments, the hosts 101, 102 and 103 and the CXL storage devices 130, 140 and 150 may be configured to share the same interface with each other. For example, the hosts 101, 102 and 103 and the CXL storage devices 130, 140 and 150 may communicate with each other through a compute express link (CXL) interface 120. In some embodiments, the CXL interface 120 may mean a low-latency and high-bandwidth link that support coherency, memory access, and dynamic protocol muxing of dynamic protocols of input/output protocols (IO protocols) to enable various connections between accelerators, memory devices or various electronic devices.

Figure 2:
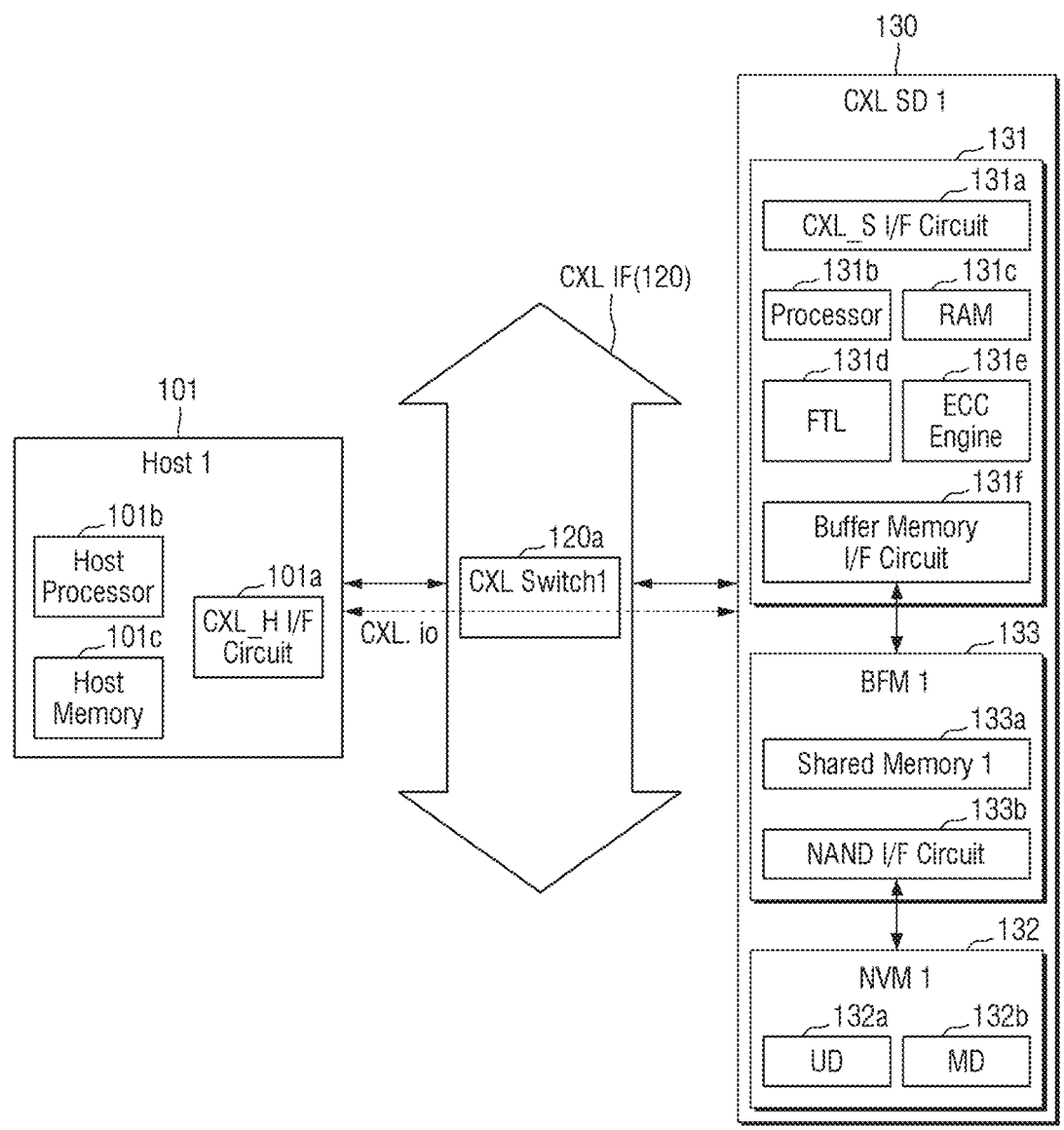
FIG. 2 is an exemplary diagram for explaining the components of the host and the CXL storage of FIG. 1 in detail.

FIG. 2 is an exemplary diagram for explaining the components of the host and the CXL storage of FIG. 1 in detail.

FIG. 2 shows the host 101 and the CXL storage device 130 ("CXL SD 1"). The description of the host 101 is also equally applicable to the hosts 102 and 103 (shown in FIG. 1), and the description of the CXL storage device 130 is also equally applicable to the CXL storage devices 140 and 150 (shown in FIG. 1). Thus, the descriptions of the host 101 and the CXL storage device 130 are substituted for the descriptions of the hosts 102 and 103 and the CXL storage devices 140 and 150.

In an embodiment, the host 101 and the CXL storage device 130 communicate with each other through the CXL interface 120. However, embodiments are not limited thereto, and the host 101 and the CXL storage device 130 may communicate with each other on the basis of various computing interfaces such as a GEN-Z protocol, a NVLink protocol, a cache coherent interconnect for accelerators (CCIX) protocol, and an open coherent accelerator processor interface (Open CAPI) protocol.

Referring to FIG. 2, the CXL interface 120 may include a lower protocol 'CXL.io,' and may include 'CXL.cache' and 'CXL.mem.' The CXL.io protocol is a PCIe transaction layer, and may be used in the computing system 100 for device search, interrupt management, provision of access by register, initialization processing, signal error processing, and the like. The CXL.cache protocol may be used when an accelerator (e.g., GPU or field programmable gate array (FPGA) accesses the host memory 101c. The CXL.mem protocol may be used when the host 101 accesses exclusive memory of the accelerator or the buffer memory 133 of the CXL storage device 130.

In some embodiments, the host 101 and the CXL storage device 130 may communicate with each other, using CXL.io (an I/O protocol). The CXL.io may have a PCIe-based inconsistent I/O protocol. The host 101 and the CXL storage device 130 may send and receive various types of information including the user data 132a, using the user CXL.io.

The host 101 may include a host processor 101b, a host memory 101c, and a CXL host interface circuit 101a. The host processor 101b may control the operation of the host 101 as a whole. In some embodiments, the host processor 101b may be one of the plurality of modules provided in the application processor (AP), and the application processor may be implemented as a system-on-chip (SOC).

The host memory 101c is a working memory, and may store commands, programs, data, and the like required for the operation of the host processor 101b. In an embodiment, the host memory 101c may function as a buffer memory for temporarily storing the data to be transmitted to or from the CXL storage device 130. If the host processor 101b is implemented as an AP, the host memory 101c may be an embedded memory provided within the AP, or may be a non-volatile memory or memory module placed outside the AP.

According to some embodiments, the host processor 101b and the host memory 101c may be implemented as separate semiconductor chips. In some embodiments, the host processor 101b and the host memory 101c may be integrated on the same semiconductor chip.

The CXL host interface circuit 101a may communicate with the CXL storage device 130 through the CXL interface 120. Specifically, the CXL host interface circuit 101a may communicate with the CXL storage device 130 through a CXL switch 120a included in the CXL interface 120. The CXL switch 120a will be described in detail below with reference to FIG. 3.

The CXL storage device 130 may include a CXL storage controller 131, a buffer memory 133, and a non-volatile memory 132. The CXL storage controller 131 may include a CXL storage interface circuit 131*a*, a processor 131*b*, a RAM 131*c*, a flash translation layer (FTL) 131*d*, an error correction code (ECC) engine 131*e*, and a buffer memory interface circuit 131*f*.

The CXL storage interface circuit 131*a* may be connected to the CXL switch 120*a*. The CXL storage interface circuit 131*a* may communicate with the host 101 or other CXL storage devices 140 and 150 through the CXL switch 120*a*.

The processor 131*b* may be configured to control the general operation of the CXL storage controller 131. The RAM 131*c* may be used as a working memory or a buffer memory for the CXL storage controller 131.

The FTL 131*d* may perform various management operations for efficiently using the non-volatile memory 132. In an embodiment, the FTL 131*d* may perform an address conversion between a logical block address managed by the host 101 and a physical block address used in the non-volatile memory 132, on the basis of the map data or the mapping table. The FTL 131*d* may perform a bad block management operation on the non-volatile memory 132. The FTL 131*d* may perform a wear leveling operation on the non-volatile memory (NVM). The FTL 131*d* may also perform a garbage collection operation on the non-volatile memory 132.

In some embodiments, the FTL 131*d* may be implemented on the basis of software, hardware, firmware or a combination thereof. When the FTL 131*d* is implemented in the form of software or firmware, the program codes associated with the FTL 131*d* may be stored in the RAM 131*c* and may be driven by the processor 131*b*. If the FTL 131*d* is implemented as hardware, hardware configurations configured to perform the various management operations described above may be implemented in the CXL storage controller 131.

The ECC engine 131*e* may perform error detection and correction functions on the data that is stored the non-volatile memory 132. For example, the ECC engine 131*e* may generate parity bits for the user data 132*a* to be stored in the non-volatile memory 132, and the parity bits thus generated may be stored in the non-volatile memory 132 together with the user data 132*a*. When the user data 132*a* is read from the non-volatile memory 132, the ECC engine 131*e* may detect and correct an error of the user data 132*a*, using the parity bits that are read from the non-volatile memory 132, together with the read user data 132*a*.

The buffer memory interface circuit 131*f* may control the buffer memory 133, thus data is stored in the buffer memory 133 or data is read from the buffer memory 133. In some embodiments, the buffer memory interface circuit 131*f* may be implemented to comply with standards such as a DDR interface, and a low power double data rate interface (LPDDR) interface.

The buffer memory 133 may store data or output the stored data under the control of the CXL storage controller 131. Also, the buffer memory 133 may store various types of information necessary for the CXL storage device 130 to operate. For example, the buffer memory 133 may include a shared memory. In some embodiments, the buffer memory 133 may be a high-speed memory such as a DRAM.

The shared memory ("Shared Memory 1") 133*a* may store data collected by monitoring its own (that is, the CXL storage device 130) status, for example, a hardware status and a software status, by the CXL storage controller 131. The hardware status may include remaining capacity, a number of bad blocks, temperature, lifetime, and the like.

The software status may include a degree of busyness, an amount of commands (or requests) received from the host 101, command patterns (or request patterns) frequently requested from the host 101, data patterns requested from the host, and the like.

In an embodiment, the shared memory 133*a* may include information about the degree of degradation of the non-volatile memory 132. For example, the CXL storage controller 131 may check the degree of degradation of the non-volatile memory 132, and update information about the degree of degradation of the non-volatile memory 132 to the shared memory 133*a*.

Other devices, which are connected to the CXL storage device 130 through the CXL interface 120 in the computing system 100, may access the shared memory 133*a* of the CXL storage device 130. For example, the CXL storage controller 131 may access the shared memory 143*a* (shown in FIG. 3) of the CXL storage device 140 through the CXL switch 120*a*, and may acquire information about the degree of degradation of the non-volatile memory 142 (shown in FIG. 3) of the CXL storage device 140 through the access. Similarly, the host 101 may access the shared memory 133*a* of the CXL storage device 130 through the CXL switch 120*a*. When the CXL storage devices 130, 140 and 150 are connected through the CXL switches (CXL Switch 1 120*a* and CXL Switch 2 120*b*, shown in FIG. 3) and each of the CXL storage devices 130, 140 and 150 include the shared memories 133*a*, 143*a* and 153*a* (shown in FIG. 3). In this way, information about the degree of degradation of the non-volatile memory of any one CXL storage device may be shared with other CXL storage devices through the CXL interface 120.

The shared memory 133*a* is shown as being placed in the buffer memory 133 in FIG. 2, but the embodiments are not limited thereto. In some embodiments, the shared memory 133*a* may be placed outside the buffer memory 133 to be accessible by the CXL storage controller 131. That is, the shared memory 133*a* may not store data that is temporarily stored in the buffer memory 133, but may store data that is non-temporarily stored inside the CXL storage device 130 (e.g., inside the CXL storage controller 131) for the operation of the CXL storage device 130.

FIG. 2 shows that the buffer memory 133 is placed between the CXL storage controller 131 and the non-volatile memory 132 outside the CXL storage controller 131, but the embodiments are not limited thereto. In some embodiments, the buffer memory 133 may be a configuration provided inside the CXL storage controller 131.

The NAND interface circuit 133*b* may control the non-volatile memory 132, thus data is stored in the non-volatile memory 132 or data is read from the non-volatile memory 132. In some embodiments, the NAND interface circuit 133*b* may be implemented to comply with standards such as toggle interface or open NAND flash interface (ONFI).

For example, if the non-volatile memory 132 includes the plurality of NAND flash devices and the NAND interface circuit 133*b* is implemented on the basis of a toggle interface, the NAND interface circuit 133*b* may communicate with the plurality of NAND flash devices through the plurality of channels, and the plurality of NAND flash devices may be connected to the plurality of channels through a multi-channel and multi-way structure.

In some embodiments, the NAND interface circuit 133*b* may transmit a chip enable signal (/CE), a command latch enable signal (CLE), an address latch enable signal (ALE), a read enable signal (/RE), and a write enable signal (/WE) to each of a plurality of NAND flash devices through each of a plurality of channels. In an embodiment, the NAND interface circuit 133b and each of the plurality of NAND flash devices may send and receive the data signal DQ and the data strobe signal DQS through each of the plurality of channels.

The NAND interface circuit 133b is shown in FIG. 2 as being included in the buffer memory 133, but the embodiments are not limited thereto. In an embodiment, if the buffer memory 133 is included in the CXL storage controller 131, the NAND interface circuit 133b may be placed inside the CXL storage controller 131 and outside the buffer memory 1331.

The non-volatile memory 132 may store or output the user data 132a under the control of the CXL storage controller 131. In an embodiment, the non-volatile memory 132 may store or output the map data 132b under the control of the CXL storage controller 131. In some embodiments, the map data 132b stored in the non-volatile memory 132 may include mapping information corresponding to the entire user data 132a stored in the non-volatile memory 132. In some embodiments, the map data 132b relating to some of the mapping information of the user data 132a stored in the non-volatile memory 132 may be included in the buffer memory 133, as another embodiment.

Figure 3:
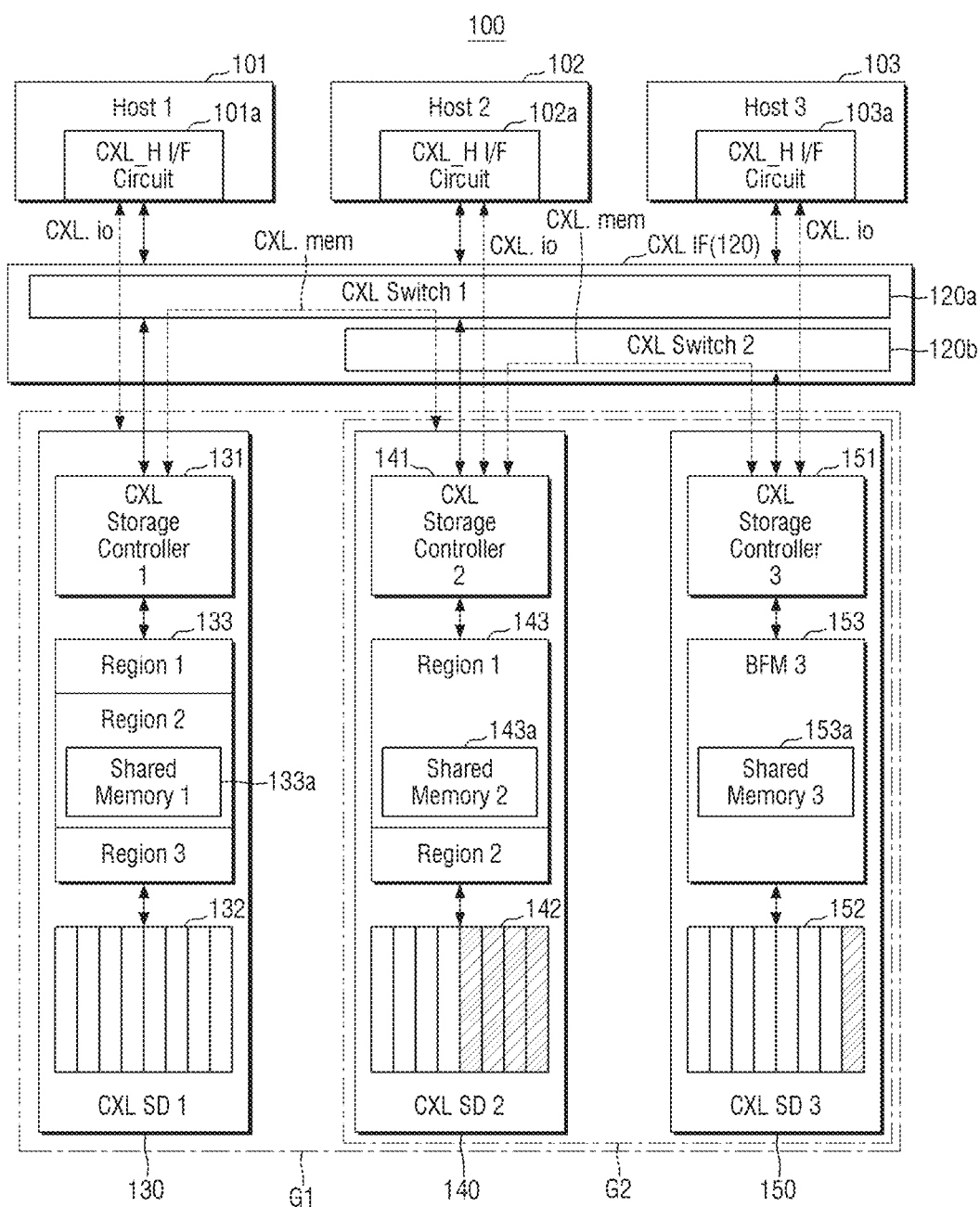
FIG. 3 is an exemplary diagram for explaining the computing system of FIG. 1.

FIG. 3 is an exemplary diagram for explaining the computing system of FIG. 1.

Referring to FIG. 3, the CXL interface 120 may include a CXL switch 120a ("CXL Switch 1") and a CXL switch 120b ("CXL Switch 2"). The CXL storage device 130 may be connected to (or communicate with) the hosts 101, 102 and 103 through the CXL switch 120a. The CXL storage devices 140 and 150 may be connected to (or communicate with) the hosts 101, 102 and 103 through the CXL switches 120a and 120b.

That is, the CXL switch 120a may be configured to arbitrate communications between the hosts 101, 102 and 103 and the CXL storage devices 130, 140 and 150. For example, when the hosts 101, 102 and 103 and the CXL storage devices 130, 140 and 150 communicate with each other, the CXL switch 120a may be configured to send information, such as requests, data, responses or signals sent from the hosts 101, 102 and 103 or the CXL storage devices 130, 140 and 150, to the CXL storage devices 130, 140 and 150 or the hosts 101, 102 and 103.

In an embodiment, the CXL switch 120b may be configured to arbitrate communications between the hosts 101, 102 and 103 and the CXL storage devices 140 and 150. In an embodiment, when the hosts 101, 102 and 103 and the CXL storage devices 140 and 150 communicate with each other, the CXL switch 120b may be configured to send information (such as requests, data, responses or signals sent from the hosts 101, 102 and 103 or the CXL storage devices 140 and 150) to the CXL storage devices 140 and 150 or the hosts 101, 102 and 103. In the embodiment, the CXL storage device 130 may not be connected to the CXL switch 120b, and therefore, the CXL storage device 130 may not connected to the hosts 101, 102 and 103 through the CXL switch 120B.

According to some embodiments, the CXL switches (included in the CXL interface 120) may have a hierarchical structure. In an embodiment, the CXL switch 120a may be an upper level switch, and the CXL switch 120a may be a lower level switch. In an embodiment, the plurality of CXL storage devices 130, 140 and 150 may be grouped depending on whether they are connected to each other through the single CXL switch. In an embodiment, the CXL storage devices 130, 140 and 150 (connected to each other through the CXL switch 120a) may form one group G1, and the CXL storage devices 140 and 150 (connected to each other through the CXL switch 120b) may form another group G2. In the embodiment, the group G2 may be a lower level group than the group G1, because the CXL switch 120b is a lower level switch than the CXL switch 120a.

Among the CXL storage devices included in the upper level group, the CXL storage device that is not connected to the lower level switch may not be included in the lower level group. In an embodiment, the CXL storage device 130 may not be connected to the CXL switch 120b and thus may not be included in the group G2, which corresponds to the lower level of the group G1. In the embodiment, the CXL storage devices 140 and 150 included in the same lower group G2 may communicate with each other through the CXL switch 120b. When the CXL storage device 130 communicates with the CXL storage devices 140 and 150 (included in the group G2), the CXL storage device 130 may communicate with the CXL storage devices 140 and 150, through both of the CXL switch 120a and the CXL switch 120b.

In some embodiments, the CXL storage devices 130, 140 and 150 may communicate with each other, using CXL.mem (a memory access protocol). The CXL.mem may be a memory access protocol that supports the memory access. The CXL storage device 130 may access the shared memory 143a of the CXL storage device 140, using the CXL.mem. Similarly, the CXL storage device 140 may access the shared memory 133a of the CXL storage device 130 or the shared memory 153a of the CXL storage device 150, using the CXL.mem.

According to an embodiment, each memory (e.g., the buffer memory 133, 143 and 153 or the shared memory 133a, 143a and 153a) of the hosts 101, 102 and 103 and the CXL storage devices 130, 140 and 150 may communicate with each other using the CXL.mem. For example, the hosts 101, 102 and 103 may access the shared memories 133a, 143a and 153a of each of the CXL storage devices 130, 140 and 150, using the CXL.mem. Also, each of the CXL storage controllers 131, 141 and 151 may transmit the data stored in each of the buffer memories 133, 143 and 153 to each of the hosts 101, 102 and 103 through the CXL.mem.

In some embodiments, the buffer memory 133, 143 and 153 of each of the CXL storage devices 130, 140 and 150 may be divided into one or more regions. For example, each of the CXL storage controllers 131, 141 and 151 divides the storage space of each of the buffer memories 133, 143 and 153 into one or more regions and may provide them to each of the hosts 101, 102 and 103. In this case, each of the hosts 101, 102 and 103 may recognize different regions within one buffer memory as independent storage spaces. For example, the hosts 101, 102, and 103 may recognize regions ("Region 1," "Region 2," and "Region 3") of the buffer memory 133 of the CXL storage device 130 as independent storage spaces.

In some embodiments, the shared memory 133a, 143a and 153a ("Shared Memory 1", "Shared Memory 2", and "Shared Memory 3", respectively) of each of the CXL storage devices 130, 140 and 150 may be included in any one region of the plurality of regions, and a single region may be allocated to the shared memory. For example, as shown in FIG. 3, the shared memory 133a may be included in the region ("Region 2") of the buffer memory 133. In some embodiments, the entire region ("Region 2") of the buffer memory 133 may be allocated to the shared memory 133a.

In some embodiments, one host may access the plurality of regions. For example, the host 101 may access the regions ("Region 1" and "Region 2") of the CXL storage device 130 at the same time or with a time lag. In an embodiment, the host 101 may access the region ("Region 3") of the CXL storage device 130 and the region ("Region 1") of the CXL storage device 140 at the same time or with a time lag.

Furthermore, in some embodiments, the plurality of hosts 101, 102 and 103 may access one region in one buffer memory at the same time. In an embodiment, the host 101 and the host 102 may access an region (for example, "Region 3") of the CXL storage device 130 at the same time or substantially at the same time. In this way, when the plurality of hosts access any one region of the CXL storage device at the same time or substantially at the same time, a workload concentrates on the CXL storage device, and the lifetime of the CXL storage device may be sharply reduced.

Figure 4:
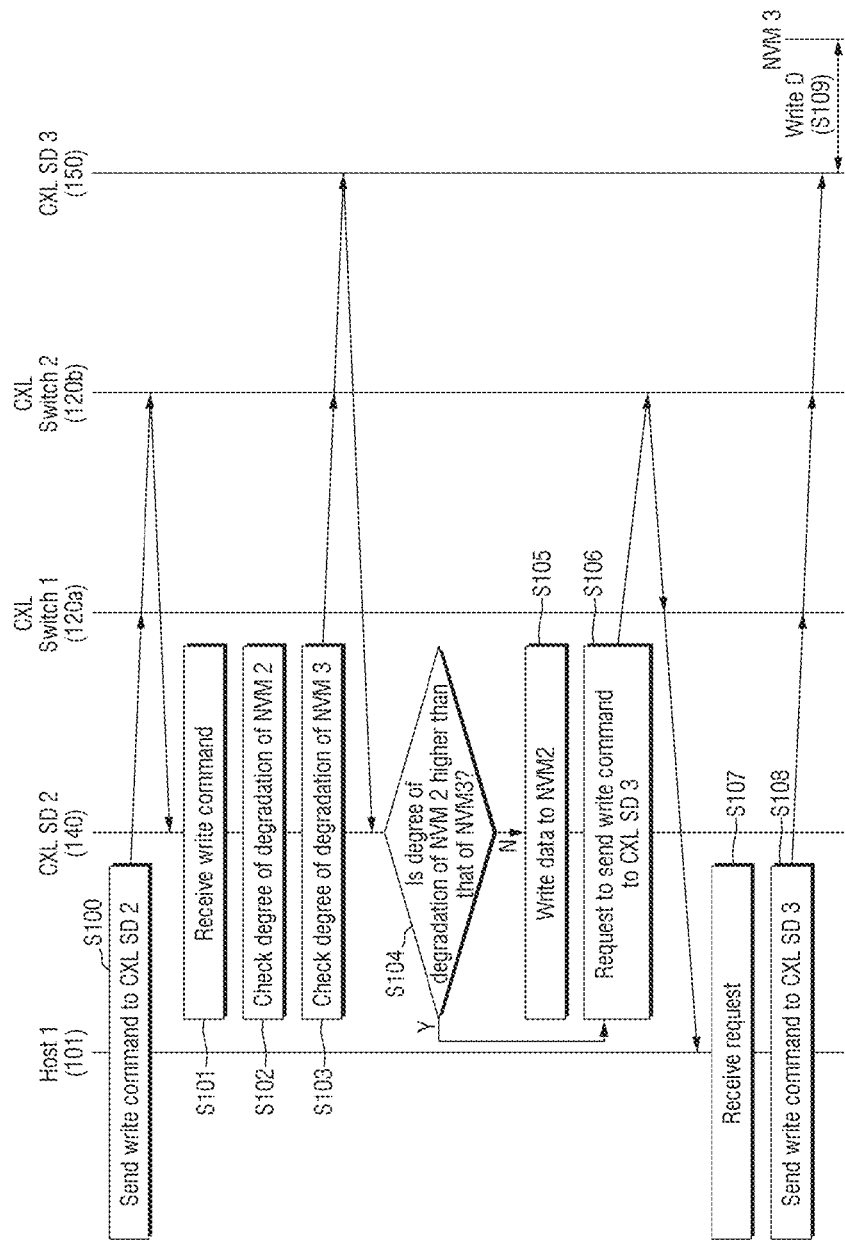
FIG. 4 is an exemplary flow chart for describing an operation of the computing system according to some embodiments.

FIG. 4 illustrates operations of the computing system according to some embodiments. FIG. illustrates the operations of the computing system of FIG. 4. The operations of the computing system according to some embodiments will be described below with reference to FIGS. 4 and 5. Although a case where the host 101 transmits a write command to the CXL storage device 140 will be described below as an example, the following description is also applicable to a case where any one of the other hosts 102 and 103 transmits the write command to any one of the CXL storage devices 130, 140 and 150.

Figure 5:
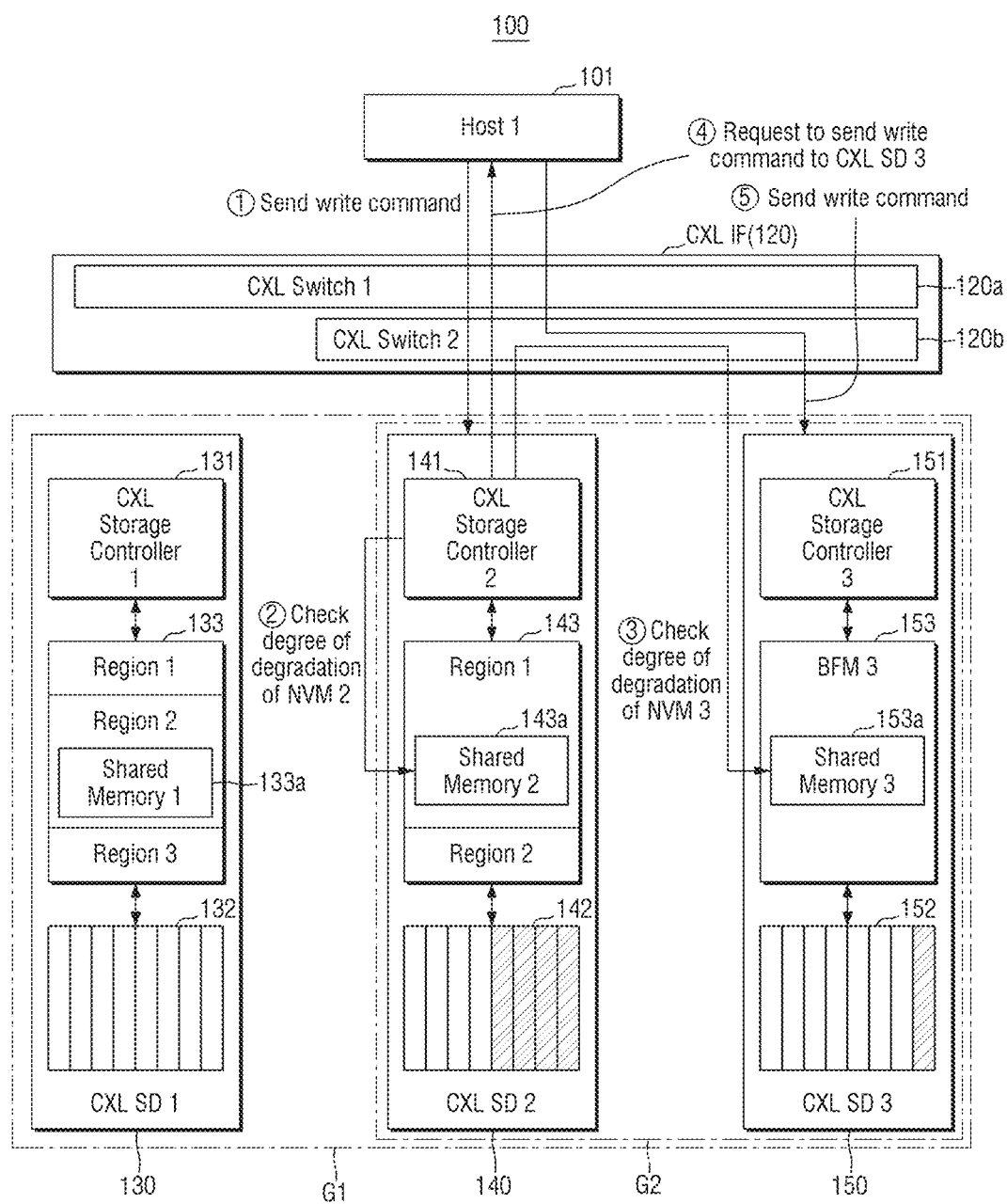
FIG. 5 is an exemplary diagram for explaining the operation of the computing system of FIG. 4.

Referring to FIGS. 4 and 5, the host 101 may issue the write command for writing the write data to the CXL storage device 140 through the CXL host interface 120 in operation S100. The write command may be sent to the CXL switch 120a, and the CXL switch 120a may send the write command to the CXL switch 120b. The CXL switch 120b may send the write command to the CXL storage device 140 that is a target of the write command.

Next, in operations S101, S102, and S103, the CXL storage controller 141 of the CXL storage device 140 may check a degree of degradation of the non-volatile memory 142 through the shared memory 143a, and may check a degree of degradation of the non-volatile memory 152 through the shared memory 153a, in response to reception of (or based on) the write command from the CXL switch 120b. In the embodiment, the CXL storage controller 141 may access the shared memory 153a of the CXL storage device 150 through the CXL switch 120b to acquire information about the degree of degradation of the non-volatile memory 152.

Next, in operation S104, the CXL storage controller 141 may compare the degree of degradation of the non-volatile memory 142 with the degree of degradation of the non-volatile memory 152. The CXL storage controller 141 may control to write the write data on the non-volatile memory 142 (operation S105), in response to the fact (or based on identifying) that the degree of degradation of the non-volatile memory 142 is not higher than that of the non-volatile memory 152 (S104—N). Alternatively, the CXL storage controller 141 may transmit a request for transmitting the write command to the CXL storage device 150 to the host 101 through the CXL switch 120b and the CXL switch 120a (S106), in response to the fact (or based on identifying) that the degree of degradation of the non-volatile memory 142 is higher than that of the non-volatile memory 152 (S104—Y).

Next, in operations S107 and S108, the host 101 may transmit the write command to the CXL storage device 150 through the CXL switch 120a and the CXL switch 120b in response to reception of the request (or based on the received request). After receiving the write command from the CXL switch 120b, the CXL storage controller 151 may write the write data on the non-volatile memory 152. According to the embodiment, the write data to be transmitted from the host 101 to the CXL storage device 150 may be transmitted together with the write command, or may be transmitted to the CXL storage device 150 with a time lag after the write command is transmitted from the host 101 to the CXL storage device 150.

In this way, after receiving the write command from the host 101, the CXL storage controller 141 of the CXL storage device 140 checks the degree of degradation of the non-volatile memory 152 of the other CXL storage devices (e.g., CXL storage device 150), which are included in the group G2 corresponding to the group of the lowest level among the groups G1 and G2 to which the CXL storage controller 141 belongs. In a case the degree of degradation of the non-volatile memory 142 controlled by the CXL storage controller 141 is high, and the degree of degradation of the non-volatile memory (e.g., non-volatile memory 152) of the other CXL storage device (e.g., CXL storage device 150) is low, the CXL storage controller 141 may request the host 101 to transmit the write command to the other CXL storage device (e.g., CXL storage device 150).

However, the embodiments are not limited thereto. In some embodiments, the CXL storage controller 141 of the CXL storage device 140 may request the host 101 to transmit the write command to the other CXL storage device (e.g., CXL storage device 130), which is not included in the group G2 corresponding to the group of the lowest level among the groups G1 and G2 to which the CXL storage controller 141 belongs, but the CXL storage device 130 may include the shared memory.

For example, when the CXL storage device 130 includes the shared memory 133a, the CXL storage controller 141 may access the shared memory 133a through the CXL switch 120a and the CXL switch 120b, and check the degree of degradation of the non-volatile memory 132. As a result, the CXL storage controller 141 may request the host 101 to transmit the write command to the CXL storage device 130 based on identifying that the degree of degradation of the non-volatile memory 132 being lower than the degree of degradation of the non-volatile memory 142.

Further, in some embodiments, when the degree of degradation of the non-volatile memory 142 is high and the CXL storage controller 141 may not process the write command received from the host 101, the CXL storage controller 141 checks the degree of degradation of the non-volatile memory 152 through the shared memory 153a, checks the degree of degradation of the non-volatile memory 132 through the shared memory 133a, then compares both of the degrees of the degradations, and may request the host 101 to transmit the write command to the CXL storage device of the non-volatile memory having the lower degree of degradation.

In this way, the CXL storage device (that receives the write command from the host) may actively handle the commands received from the host, by checking the degree of degradation of other CXL storage devices through the CXL interface and the shared memory.

Figure 6:
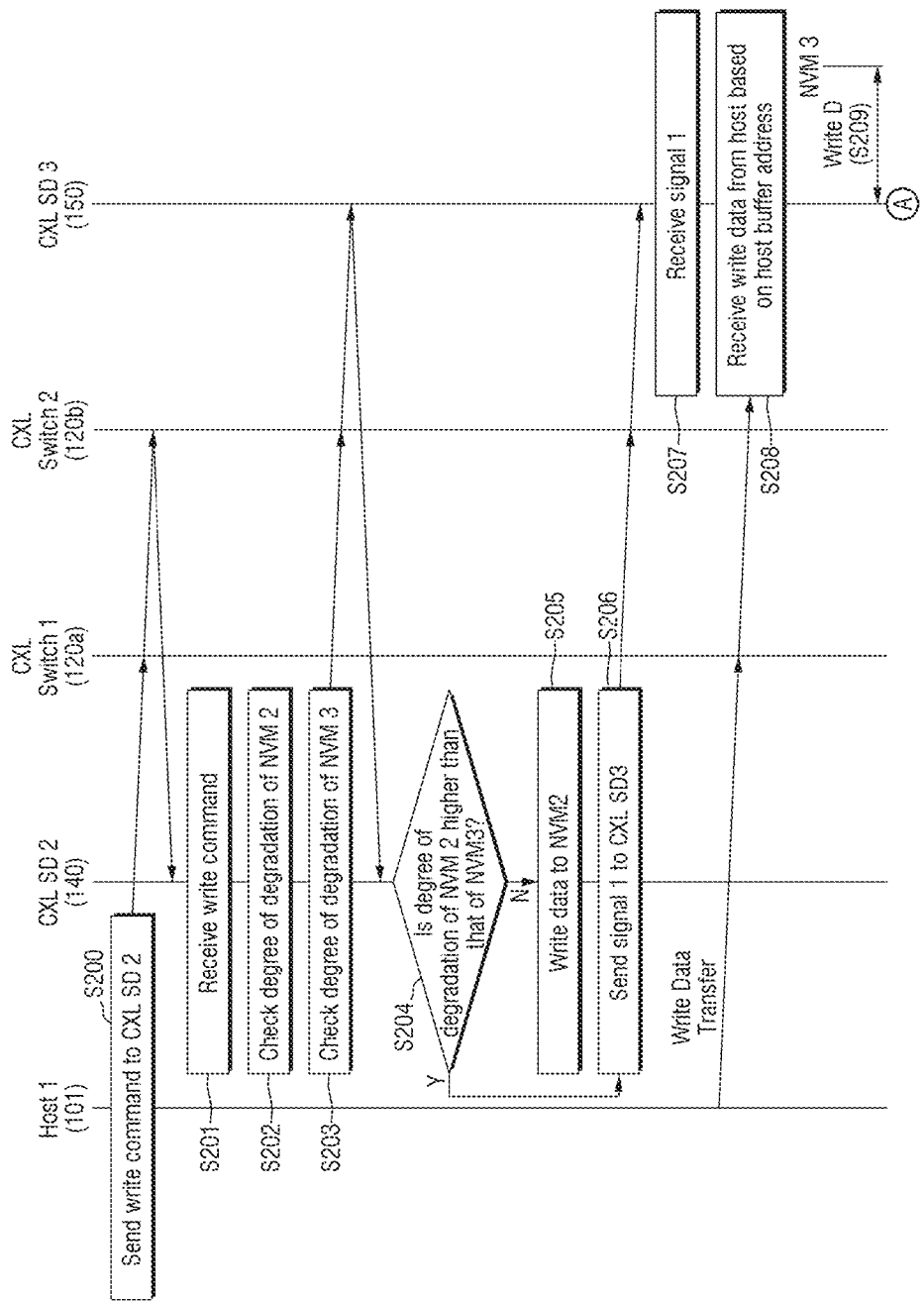
FIGS. 6 and 7 are exemplary flow charts for describing the operation of the computing system according to some embodiments.
Figure 7:
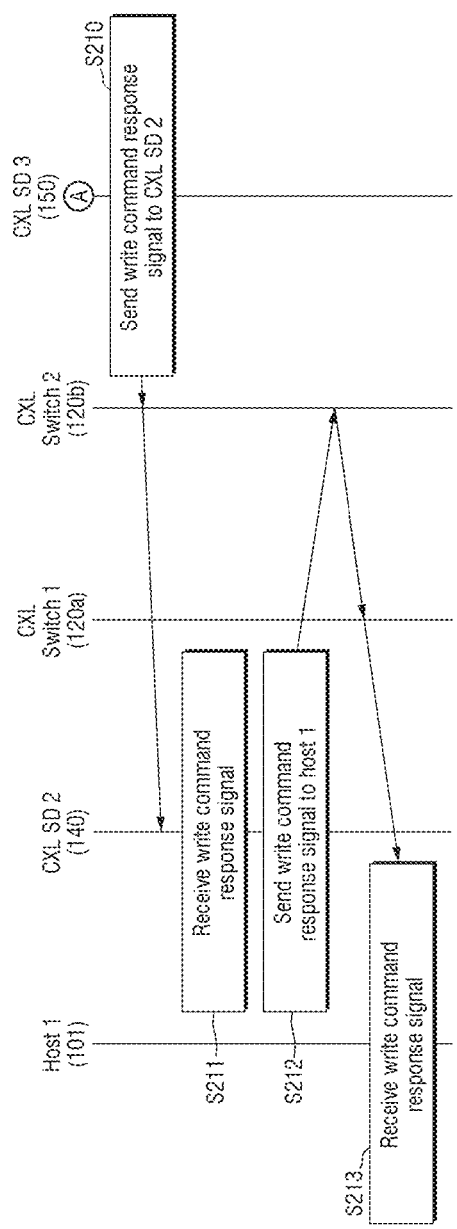
Figure 8:
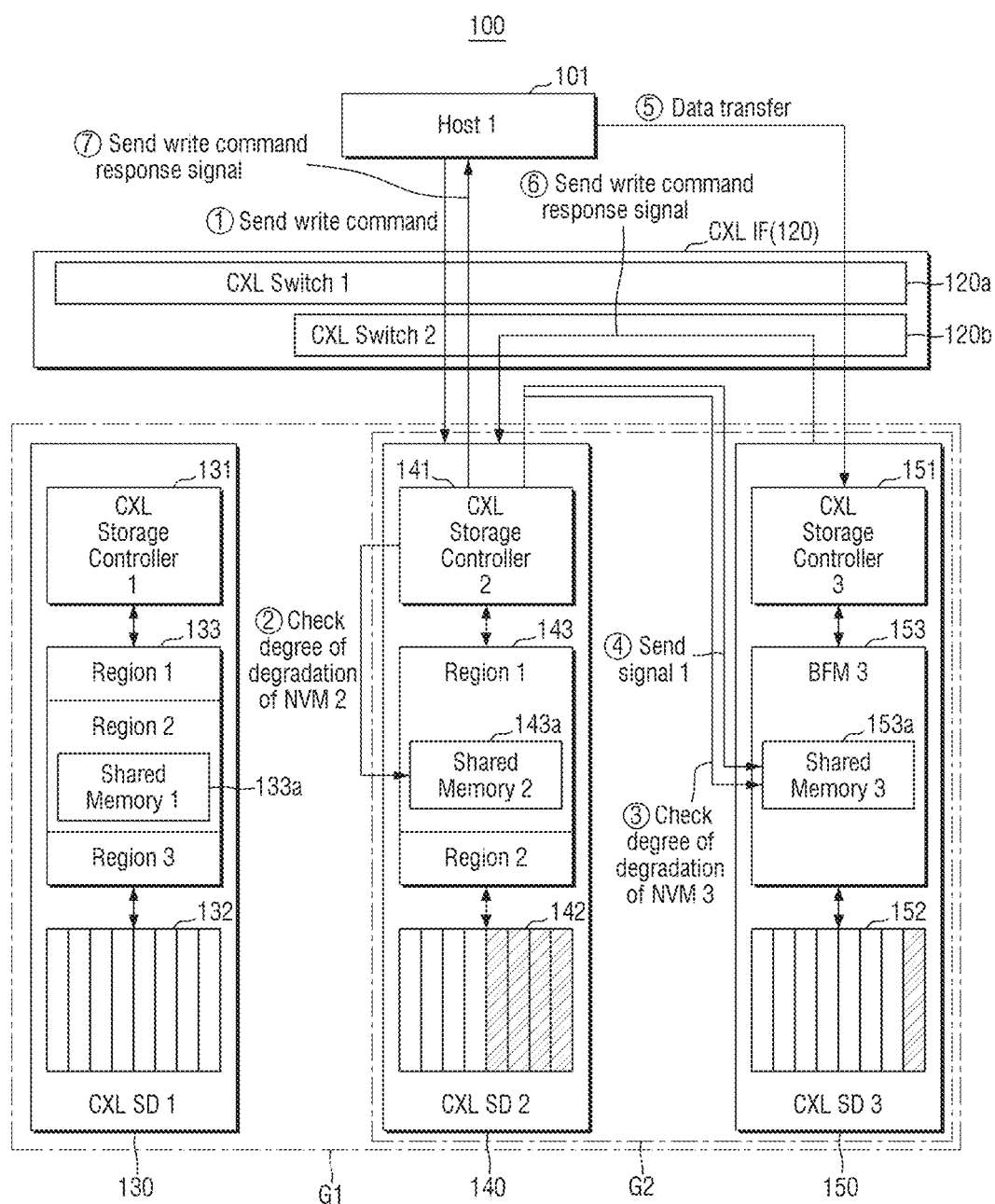
FIG. 8 is an exemplary diagram for explaining the operation of the computing system of FIGS. 6 and 7.

FIGS. 6 and 7 illustrate operations of the computing system according to some embodiments. FIG. 8 illustrates the operations of the computing system of FIGS. 6 and 7. The operation of the computing system according to some embodiments will be described below with reference to FIGS. 6 to 8.

Referring to FIGS. 6 to 8, operations S200 to S205 are the same as operations S100 to S105 of FIG. 4, and therefore, will be omitted for convenience of explanation. On the other hand, in operation S206, the CXL storage controller 141 may transmit the signal S1 to the CXL storage device 150 through the CXL switch 120b, in response to the fact (or based on identifying) that the degree of degradation of the non-volatile memory 142 is higher than the degree of degradation of the non-volatile memory 152 (S204—Y). The signal S1 may include the write command received by the CXL storage controller 141 from the host 101, and the host buffer address of the host 101 that requested the write command. The host buffer address may be received by the CXL storage controller 141 from the host 101 along with the write command.

In some embodiments, the CXL storage controller 141 may access the shared memory 153a of the CXL storage device 150 through the CXL switch 120b, and the CXL storage controller 141 may send the signal S1 to the CXL storage device 150 in the manner of updating the signal S1 to the shared memory 153a.

Next, through operations S207 and S208, the CXL storage controller 151 may receive the signal S1 through the CXL switch 120b, and receive the write data from the host 101 on the basis of the host buffer address that requested the write command. Subsequently, in operation S209, the CXL storage controller 151 may write the write data on the non-volatile memory 152 on the basis of the host buffer address.

Next, in operation S210, after performing the write command received from the CXL storage controller 141, the CXL storage controller 151 may transmit a command response signal notifying completion of the write command to the CXL storage device 140 which transmitted the write command to the CXL storage controller 151. Afterwards, in operations S211 and S212, the CXL storage controller 141 receives the command response signal through the CXL switch 120b, and may transmit the command response signal notifying completion of the write command requested by the host 101 to the host 101 that first transmitted the write command to the CXL storage controller 141, through the CXL switch 120b and the CXL switch 120a. In operation S213, the host 101 may receive the command response signal from the CXL storage device 140 through the CXL switch 120a.

In this way, the host 101 may receive the write command response signal from the CXL storage device 140 to which the host 101 first transmitted the write command, rather than from the CXL storage device 150 that performed the write command.

Figure 9:
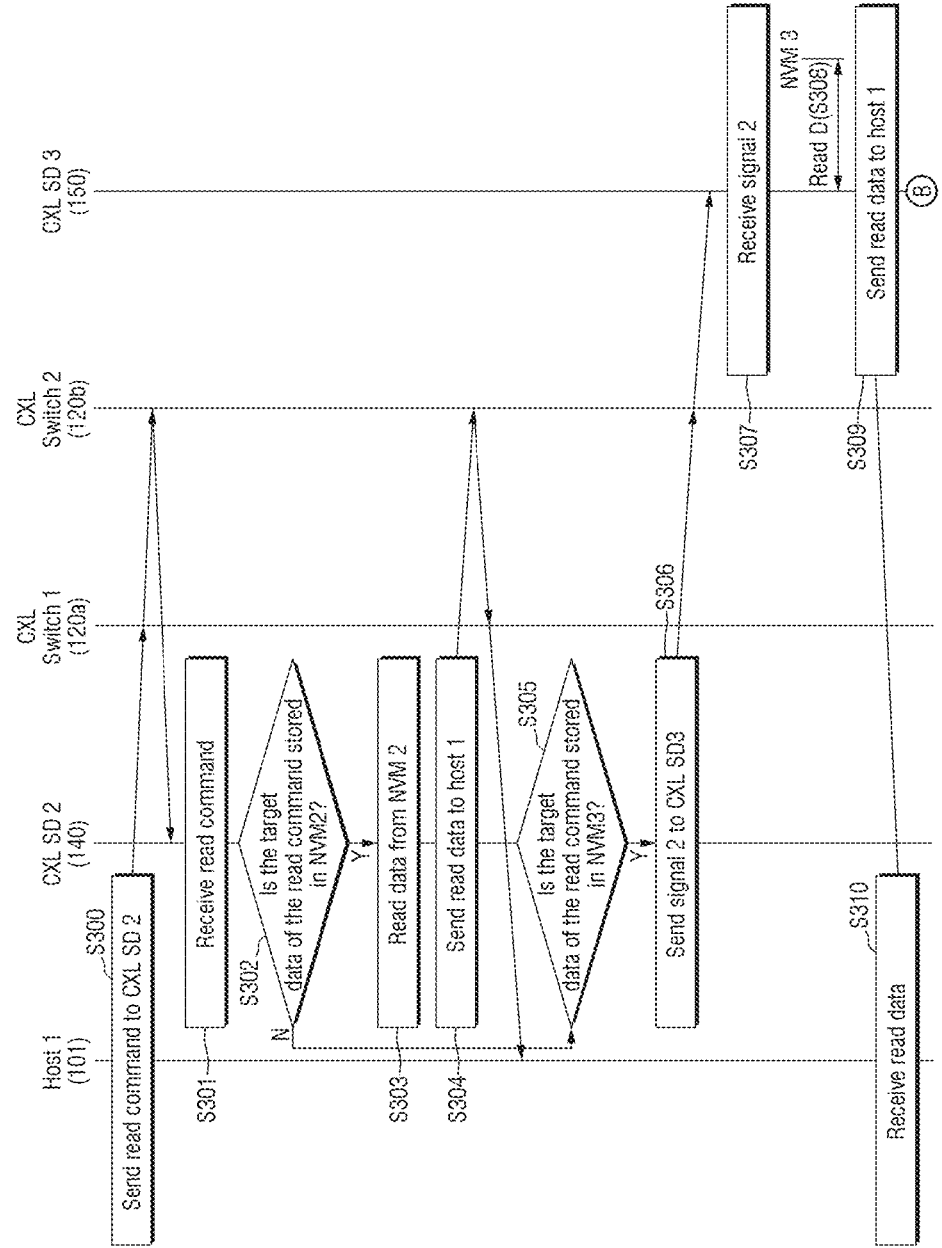
FIGS. 9 and 10 are exemplary flow charts for describing the operation of the computing system according to some embodiments.
Figure 10:
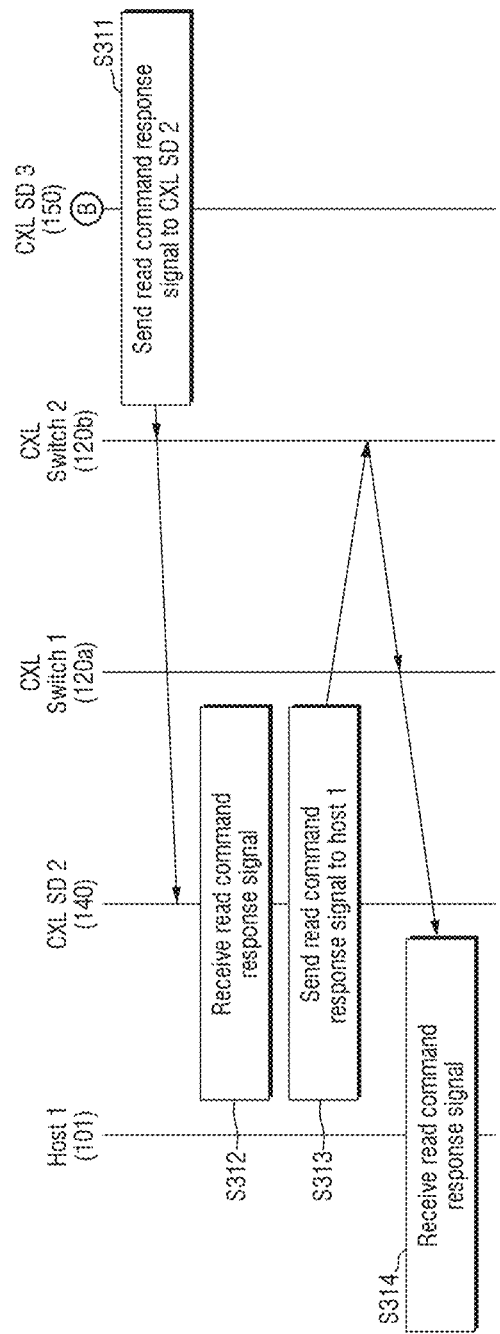
Figure 11:
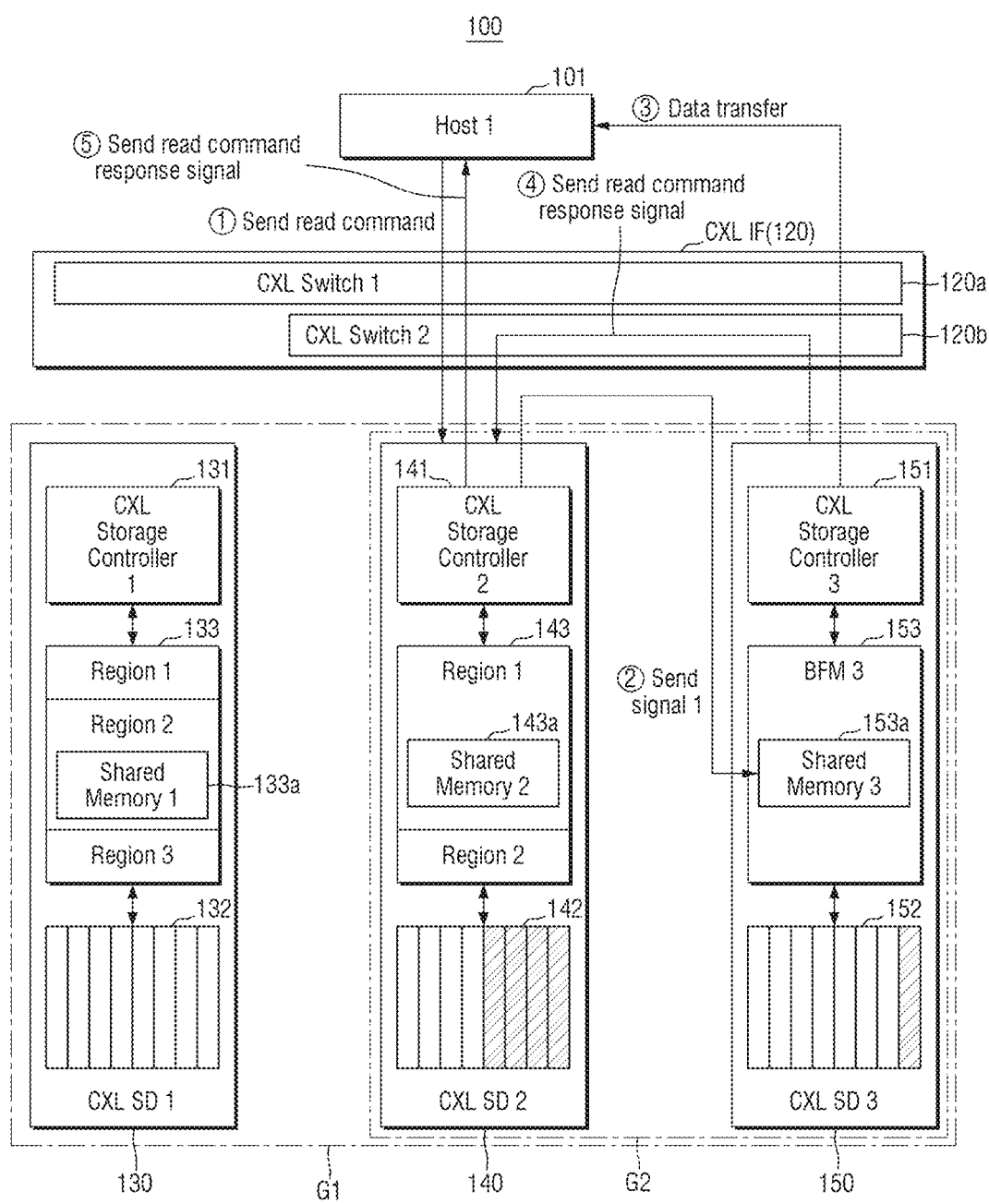
FIG. 11 is an exemplary diagram for explaining the operation of the computing system of FIGS. 9 and 10.

FIGS. 9 and 10 illustrate operations of the computing system according to some embodiments. FIG. 11 illustrates the operations of the computing system of FIGS. 9 and 10. The operations of the computing system according to some embodiments will be described below with reference to FIGS. 9 to 11.

Referring to FIGS. 9 to 11, in operation S300, the host 101 may issue the read command to the CXL storage device 140 through the CXL host interface circuit 101a (shown in FIG. 3). The read command may be sent to the CXL switch 120a, and the CXL switch 120a may send the read command to the CXL switch 120b. The CXL switch 120b may send the read command to the CXL storage device 140 that is a target of the read command.

Next, in operations S301 and S302, the CXL storage controller 141 of the CXL storage device 140 receives the read command from the CXL switch 120b, and may determine whether the data requested by the host 101 to read (hereinafter, defined as target data) is stored in the non-volatile memory 142. In a case that the target data is stored in the non-volatile memory 142 (S302, "Y"), the CXL storage controller 141 may read the target data from the non-volatile memory 142 (S303). Subsequently, in operation S304, the CXL storage controller 141 may transmit the read target data to the host 101 through the CXL switches 120b and 120a.

On the other hand, if the target data is stored in the non-volatile memory 132 (operation S302, "N"), the CXL storage controller 141 may determine whether the target data is stored in the non-volatile memory 152 in operation S305. In this way, in a case that the target data is not stored in the non-volatile memory 142 controlled by the CXL storage controller 141, the CXL storage controller 141 may check whether the target data is stored in the non-volatile memory 152 of the other CXL storage devices (e.g., CXL storage device 150) included in the group G2 corresponding to the group of the lowest level among the groups G1 and G2 to which the CXL storage controller 141 belongs. However, the embodiments are not limited thereto, and the CXL storage controller 141 may check whether the target data is stored in the other CXL storage device (for example, the CXL storage device 130 including the shared memory 133a) that is not included in the group G2 corresponding to the group of the lowest level among the groups G1 and G2 to which the CXL storage controller 141 belongs, but includes the shared memory.

In this way, in some embodiments, the host 101 may transmit the read command to the CXL storage device 140, but the target data of the read command may be stored in another CXL storage device other than the CXL storage device 140. For example, as in the embodiments described with reference to FIGS. 4 and 5 or the embodiments described with reference to FIGS. 6 to 8, although the host 101 transmits the write command to the CXL storage device 140, due to the high degree of degradation of the non-volatile memory 142 (included in the CXL storage device 140), the CXL storage device 150 connected to the CXL storage device 140 by the CXL switch 120b, rather than the non-volatile memory 142, may perform the write command, and thus, the target data may be stored in the non-volatile memory 152 of the CXL storage device 150.

However, the embodiment is not limited thereto. For example, in some embodiments, the write data may be stored in the non-volatile memory 142 in response to (or based on) the write request of the host 101 to the CXL storage device 140. However, in a case that the host 101 transmits the read command for the write data to the CXL storage device 140, the read request of the host 101 concentrates on the CXL storage device 140 at once, and latency may increase. In the embodiment, the CXL storage controller 141 may store a part of the data requested by the host to read in the buffer memory 143, and may temporarily store the remaining part of the data requested by the host to read in the buffer memory 153 of the CXL storage device 150 through the CXL switch 120b. In this case that the CXL storage controller 141 receives the read request for data stored in the CXL storage device 150 from the host 101, the CXL storage controller 151 may be controlled to perform the read request in response to the fact (or based on identifying) that the storage device 140 fails to process the read request.

Subsequently, in operation S306, when the target data is stored in the non-volatile memory 152 (S305, "Y"), the CXL storage controller 141 may transmit the signal S2 to the CXL storage device 150 through the CXL switch 120b. The signal S2 may include the read command received by the CXL storage controller 141 from the host 101, and the buffer address (host buffer address) of the host 101 that requested the read command. The host buffer address may be received by the CXL storage controller 141 from the host 101 along with the read command.

In some embodiments, the CXL storage controller 141 may access the shared memory 153a of the CXL storage device 150 through the CXL switch 120b, and may send the signal S2 to the CXL storage device 150 in the manner of updating the signal S2 to the shared memory 153a.

Next, through operations S307, S308, and S309, the CXL storage controller 151 may receive the signal S2 through the CXL switch 120b, read the target data stored in the non-volatile memory 152 on the basis of the host buffer address that requested the read command, and transmit the read data to the host 101 through the CXL switch 120b and the CXL switch 120a. Next, in operation S310, the host 101 may receive data that is read from the CXL switch 120a.

Next, in operation S311, after performing the read command received from the CXL storage controller 141, the CXL storage controller 151 may transmit a command response signal notifying completion of the read command to the CXL storage device 140 which transmitted the read command to the CXL storage controller 151. After that, in operations S312 and S313, the CXL storage controller 141 (of the CXL SD 2 140) receives the command response signal through the CXL switch 120b, and may transmit the command response signal notifying completion of the read command requested by the host 101 to the host 101 that first transmitted the read command to the CXL storage controller 141, through the CXL switch 120a and the CXL switch 120b.

In this way, the host 101 may receive the read command response signal from the CXL storage device 140 that first received the read command from the host 101, rather than from the CXL storage device 150 that performed the read command (S314).

Figure 12:
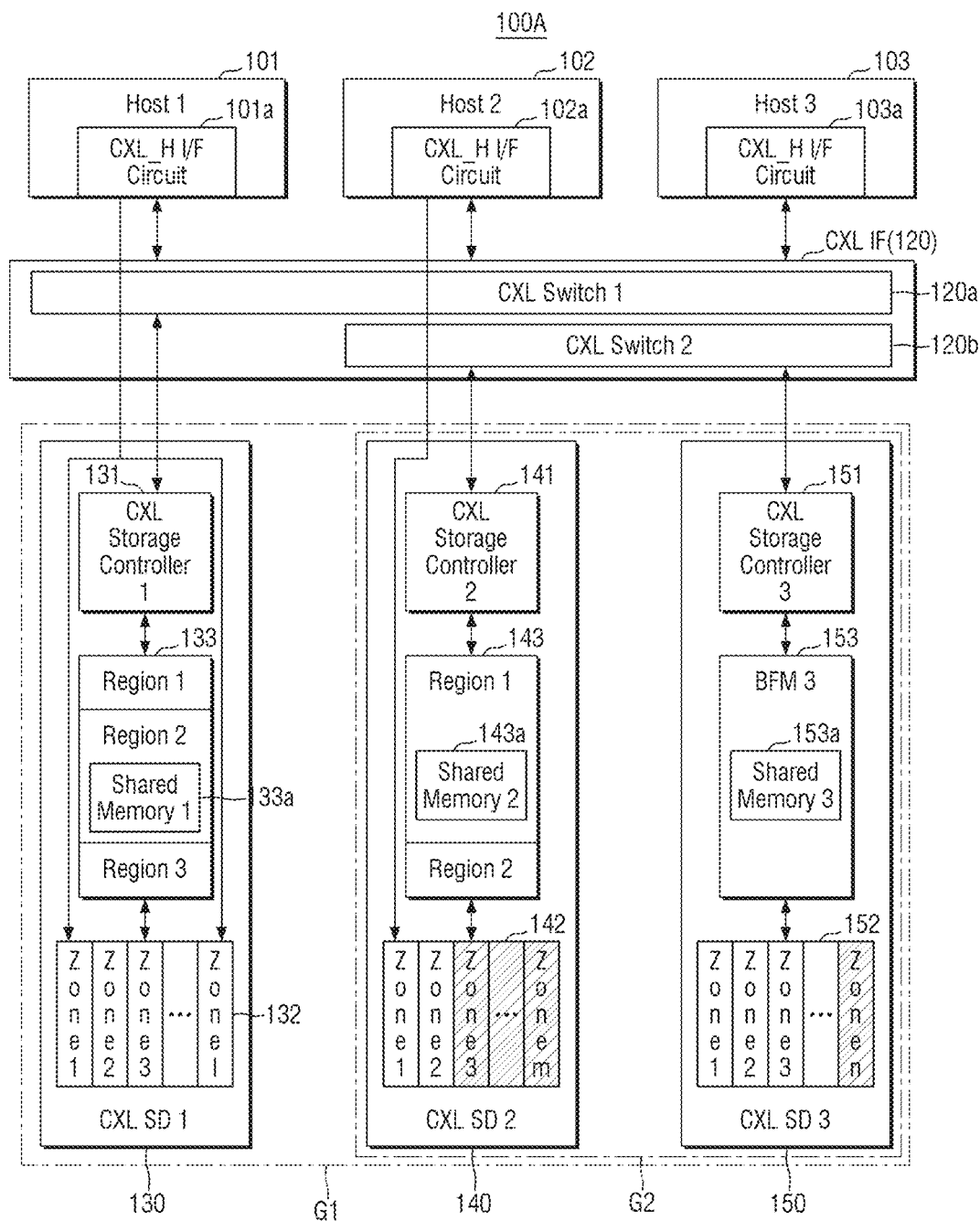
FIG. 12 is an exemplary diagram for describing a computing system according to some other embodiments.

FIG. 12 illustrates a computing system according to some other embodiments. Hereinafter, repeated descriptions of the previous embodiments will not be provided, and differences will be mainly described.

Referring to FIG. 12, the plurality of CXL storage devices 130, 140 and 150 may support (or provide) namespace and zoned namespace (ZNS). When the namespace function is used, a storage device, which is one physical device, may be divided into a plurality of logical partitions (i.e., namespaces) and data may be managed on the basis of the namespaces. When the ZNS function is used, a single namespace may be additionally divided into a plurality of zones and data may be managed on the basis of namespaces and zones. Within a single CXL storage device, the plurality of namespaces and zones are both included within the same physical storage device, and each namespace and each zone may be used as a separate storage space.

As shown in FIG. 12, each of the CXL storage devices 130, 140 and 150 may include the plurality of zones. For example, the non-volatile memory 132 of the CXL storage device 130 may include a plurality of zones ("Zone 1," "Zone 2," "Zone 3," . . . , "Zone l"), the non-volatile memory 142 of the CXL storage device 140 may include a plurality of zones ("Zone 1," "Zone 2," "Zone 3," . . . , "Zone m"), and the non-volatile memory 152 of the CXL storage device 150 may include a plurality of zones ("Zone 1," "Zone 2," "Zone 3," . . . , "Zone n"), wherein l, m, and n are integers greater than 1.

In some embodiments, the hosts 101, 102 and 103 may request the zone allocation (zone request) for each of the CXL storage devices 130, 140 and 150. The hosts 101, 102 and 103 may store data in at least one zone allocated from the CXL storage devices 130, 140 and 150, or read the data stored in the allocated zone.

Figure 13:
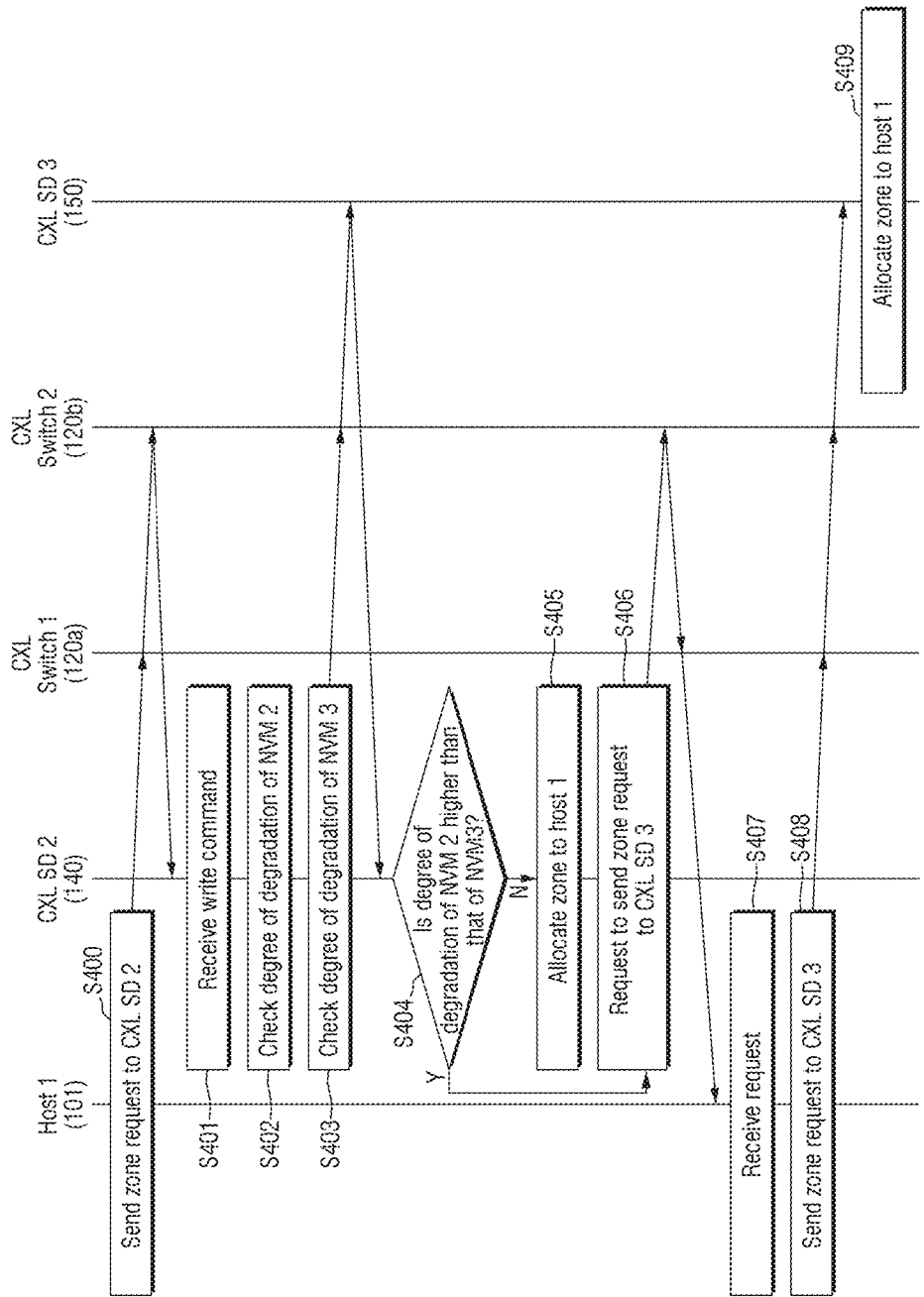
FIG. 13 is an exemplary flow chart for explaining the operation of the computing system of FIG. 12.
Figure 14:
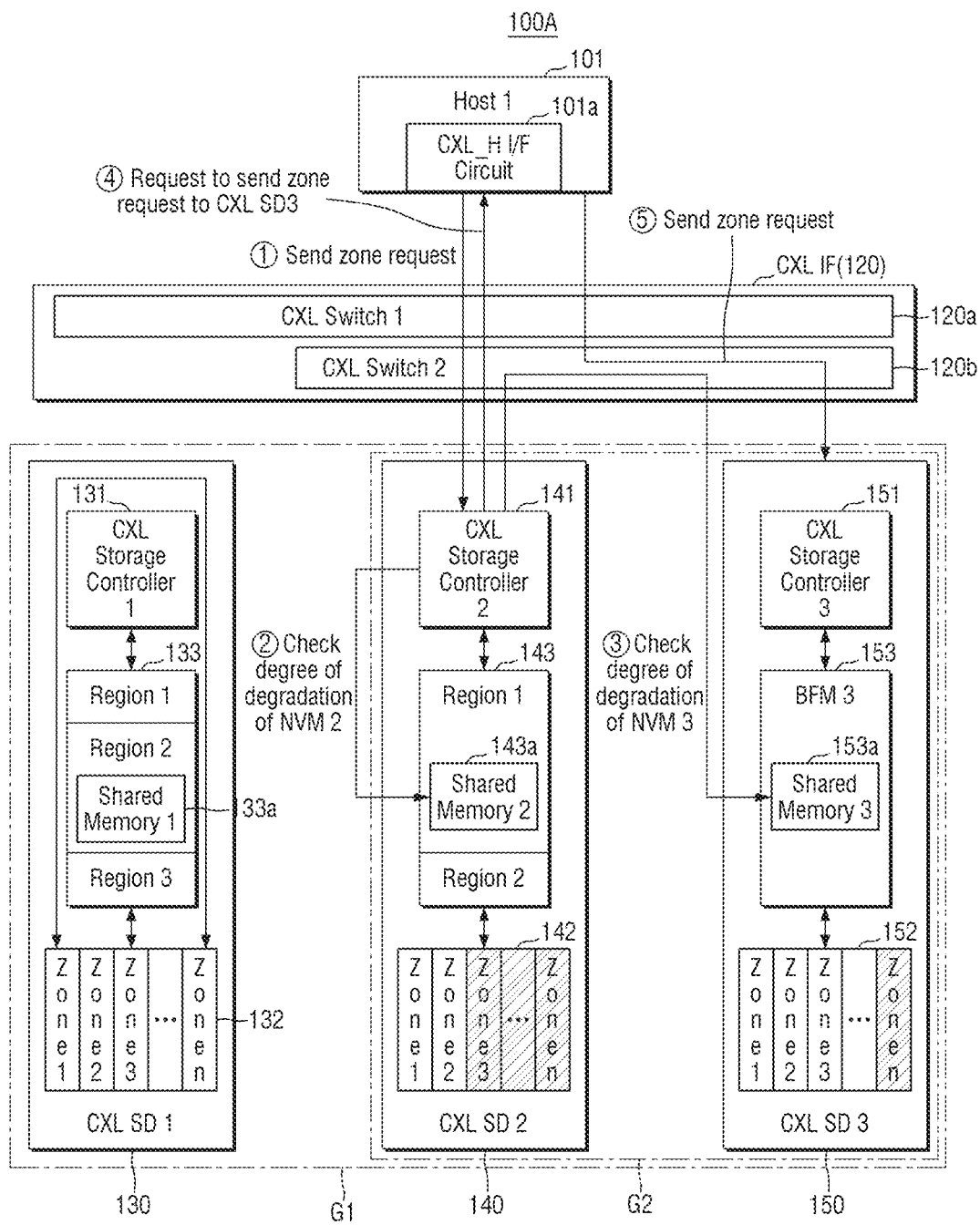
FIG. 14 is an exemplary diagram for explaining the operation of the computing system of FIG. 13.

FIG. 13 illustrates the operation of the computing system of FIG. 12. FIG. 14 illustrates the operation of the computing system of FIG. 13. The operation of the computing system according to some embodiments will be described below with reference to FIGS. 13 and 14. Although a case where the host 101 transmits the zone allocation request to the CXL storage device 140 rather than the host 101 will be described as an example, the following description is also applicable to a case where any one of the other hosts 101, 102, and 103 transmits the zone allocation request to any one of the CXL storage devices 130, 140 and 150.

Referring to FIGS. 13 and 14, in operation S400, the host 101 may issue an allocation request (zone request) for at least one zone among the zones included in the non-volatile memory 142 to the CXL storage device 140 through the CXL host interface circuit 101a (shown in FIG. 3). The zone allocation request may be sent to the CXL switch 120a, and the CXL switch 120a may send the zone allocation request to the CXL switch 120b. The CXL switch 120b may send the zone allocation request to the CXL storage device 140 that is a target of the zone allocation request.

Next, in operations S401, S402, and S403, the CXL storage controller 141 of the CXL storage device 140 may check the degree of degradation of the non-volatile memory 142 through the shared memory 143a, and may check the degree of degradation of the non-volatile memory 152 through the shared memory 153a, in response to (or based on) reception of the zone allocation request from the CXL switch 120b. In the embodiment, the CXL storage controller 141 may access the shared memory 153a of the CXL storage device 150 through the CXL switch 120b to acquire information about the degree of degradation of the non-volatile memory 152.

Next, in operation S404, the CXL storage controller 141 may compare the degree of degradation of the non-volatile memory 142 with the degree of degradation of the non-volatile memory 152. In response to the fact (or Based on identifying) that the degree of degradation of the non-volatile memory 142 is not higher than that of the non-volatile memory 152 (S404—N), the CXL storage controller 141 may allocate at least one or more zones among the zones included in the non-volatile memory 142 to the host 101 (S405). In an embodiment, the CXL storage controller 141 may transmit a request for transmitting the zone allocation request to the CXL storage device 150 to the host 101 through the CXL switch 120b and the CXL switch 120a (S406), in response to the fact (or based on identifying) that the degree of degradation of the non-volatile memory 142 is higher than that of the non-volatile memory 152 (S404—Y).

Next, in operations S407 and S408, the host 101 may transmit the zone allocation request to the CXL storage device 150 through the CXL switch 120a and the CXL switch 120b in response to (or based on) reception of the aforementioned request. After receiving the zone allocation request from the CXL switch 120b in operation S409, the CXL storage controller 151 may allocate at least one or more zones among the zones included in the non-volatile memory 152 to the host 101.

In this way, the CXL storage controller 141 of the CXL storage device 140 that has received the zone allocation request from the host 101 may check the degree of degradation of the non-volatile memory 152 of the other CXL storage devices (e.g., the CXL storage device 150) included in the group G2 corresponding to the group of the lowest level among the groups G1 and G2 to which the CXL storage controller 141 belongs. In a case that the degree of degradation of the non-volatile memory 142 controlled by the CXL storage controller 141 (of the CXL storage device 140) is high, and the degree of degradation of the non-volatile memory 152 of the other CXL storage devices (e.g., CXL storage device 150) is low, the CXL storage controller 141 may request the host 101 to transmit the zone allocation request to the other CXL storage devices (e.g., CXL storage device 150).

However, the embodiments are not limited thereto. In some embodiments, the CXL storage controller 141 of the CXL storage device 140 may request the host 101 to allocate the zone allocation request to the other CXL storage device (e.g., the CXL storage device 130 including the shared memory 133*a*) that is not included in the group G2 corresponding to the group of the lowest level among the groups G1 and G2 to which the CXL storage controller 141 belongs, but includes the shared memory.

In an embodiment, when the CXL storage device 130 includes the shared memory 133*a*, the CXL storage controller 141 may access the shared memory 133*a* through the CXL switch 120*b* and the CXL switch 120*a*, and check the degree of degradation of the non-volatile memory 132. Accordingly, the CXL storage controller 141 may request the host 101 to transmit the zone allocation request to the CXL storage device 130 in response to the case where (or based on identifying that) the degree of degradation of the non-volatile memory 142 is higher than the degree of degradation of the non-volatile memory 132.

Also, in some embodiments, in a case that the degree of degradation of the non-volatile memory 142 is high to fail to process the zone allocation requests received from the host 101, the CXL storage controller 141 may check the degree of degradation of the non-volatile memory 152 through the shared memory 153*a* and check the degree of degradation of the non-volatile memory 132 through the shared memory 133*a*, then compares both, and may request the host 101 to transmit the zone allocation request to the CXL storage device of the non-volatile memory having a low degree of degradation However, whether the CXL storage device that received the zone allocation request from the host 101 allocates the zone included in the non-volatile memory controlled by the CXL storage device to the host 101, or whether to control allocation of the zone included in the non-volatile memory of the other CXL storage device connected through the CXL interface to the host 101 is not limited to the result of comparing the degrees of degradation of both non-volatile memories. In some embodiments, the CXL storage controller of the CXL storage device that received the zone allocation request from the host 101 may compare the degree of degradation of the zones included in the non-volatile memory controlled by the CXL storage controller of the CXL storage device (e.g., an extent to which zones included in the non-volatile memory of a certain CXL storage are allocated to the host, etc.) with the degrees of degradation of zones included in the other CXL storage device connected through the CXL interface, and may control the CXL storage device with relatively low degree of degradation of zones to perform the zone allocation request of the host 101.

Figure 15:
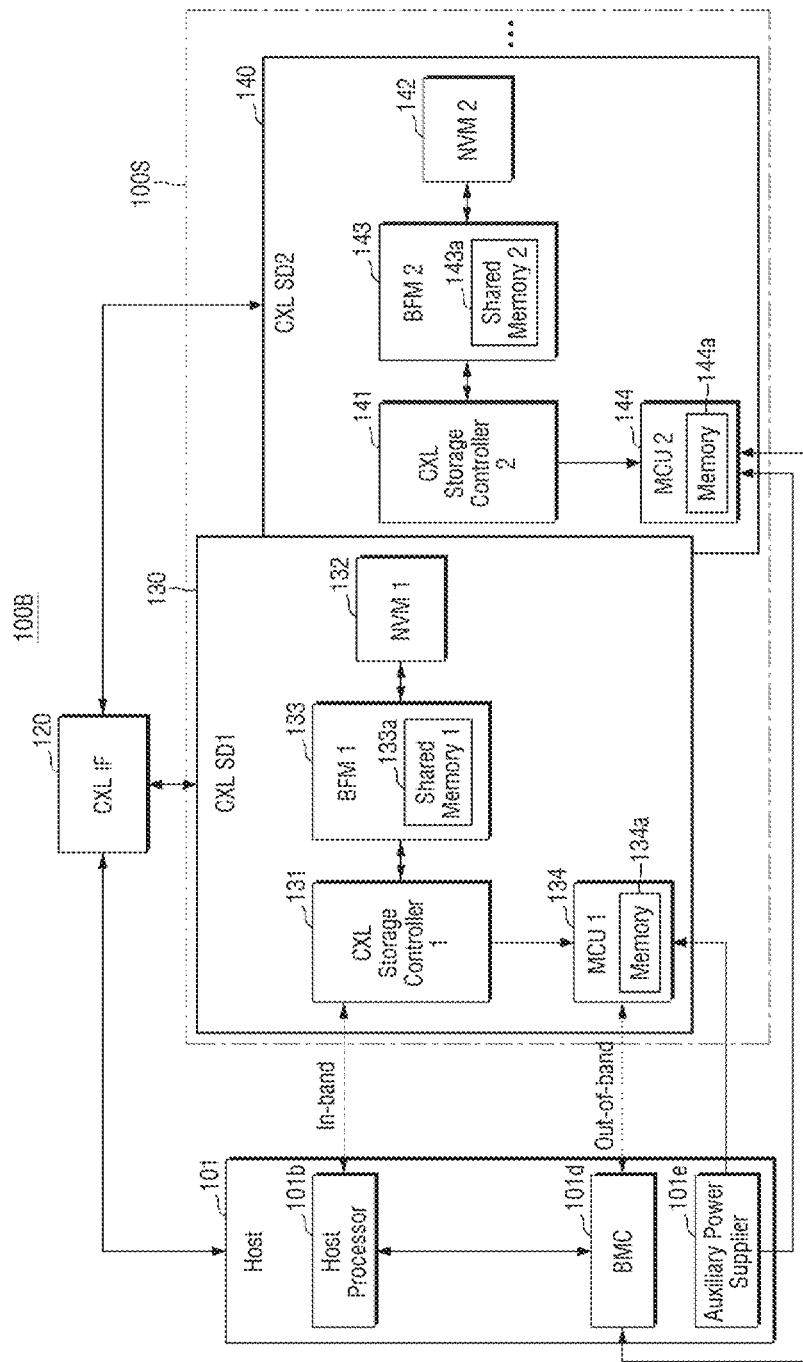
FIG. 15 is an exemplary diagram for describing a computing system according to some other embodiments.

FIG. 15 illustrates a computing system according to some other embodiments. Hereinafter, repeated descriptions of the previous embodiments will not be provided, and differences will be mainly described.

Referring to FIG. 15, in a computing system 100B, the host 101 may further include a baseboard management controller (BMC) 101*d*, and an auxiliary power supplier 101*e*. Also, the CXL storage device 130 and the CXL storage device 140 may further include a micro controller 134 (MCU 1) and a micro controller 144 (MCU 2), respectively.

The BMC 101*d* may be configured to manage the internal components of the storage system including the CXL storage devices 130, 140 and 150. In some embodiments, the BMC 101*d* may program the plurality of CXL storage devices in the storage system, including the CXL storage devices 130, 140 and 150 and set the plurality of CXL storage devices and the CXL interface 120 according to instructions given by an administrator of the computing system 100, thereby setting boot and control routes. The BMC 101*d* may monitor the physical status of servers corresponding to the host 101 using the sensors. For example, the BMC 101*d* may check hardware health information and power consumption information such as a connection status, a lifetime, a temperature, and a log information of the plurality of CXL storage devices in the storage system, including the CXL storage devices 130, 140 and 150.

The auxiliary power supplier 101*e* may supply power to the MCUs 134 and 144. Each of the MCUs 134 and 144 is supplied with voltage from the auxiliary power supplier 101*e*, and may operate separately from each of the CXL storage devices 130, 140 and 150. For example, even when the CXL storage devices 130, 140 and 150 are powered off, the MCUs 134 and 144 are powered by the auxiliary power supplier 101*e* and may still operate. The MCUs 134 and 144 may each include memories 134*a* and 144*a*. The memories 134*a* and 144*a* may be a DRAM, a SRAM, a FRAM, etc., respectively.

The MCUs 134 and 144 may communicate independently with the BMC 101*d*. That is, the MCUs 134 and 144 may send and receive signals independently of the BMC 101*d* without the control of the host processor 101*b*. A route through which the host processor 101*b* sends and receives signals to and from the CXL storage controllers 131 and 141 may be called 'in-band.' A route through which the BMC 101*d* sends and receives signals independently of the MCUs 134 and 144 may be called 'out-of-band.' In some embodiments, in a case that the host processor 101*b* and the CXL storage controllers 131 and 141 send and receive signals on the in-band route, the host processor 101*b* and the CXL storage controllers 131 and 141 may communicate with each other through the CXL interface. In a case that the BMC 101*d* and the MCUs 134 and 144 send and receive signals on the out-of-band route, the BMC 101*d* and the MCUs 134 and 144 may not communicate with each other through the CXL interface. However, the embodiments are not limited thereto. Both in-band route and out-of-band route may be connected through the CXL interface.

Figure 16:
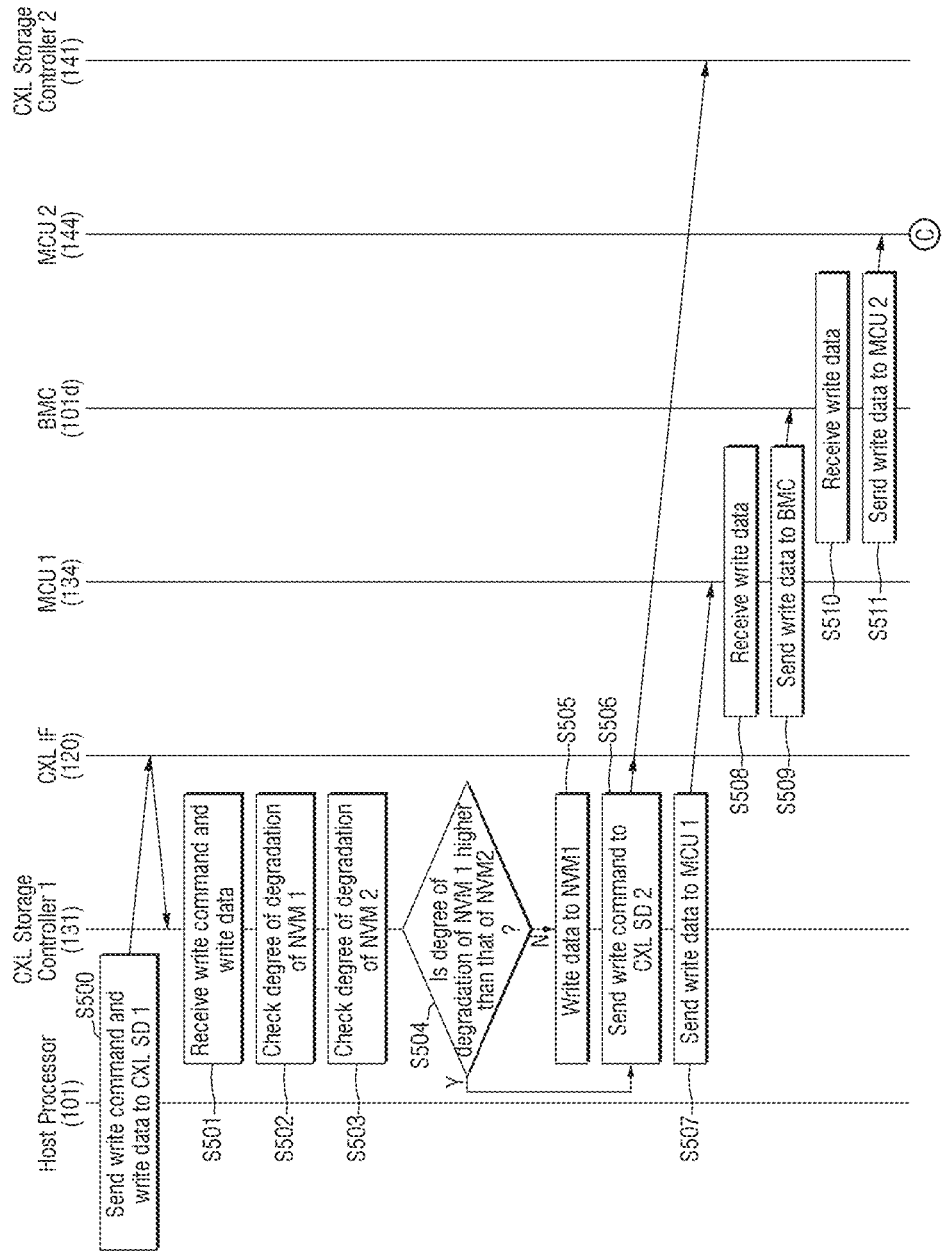
FIGS. 16 and 17 are exemplary flow charts for explaining the operation of the computing system of FIG. 15.
Figure 17:
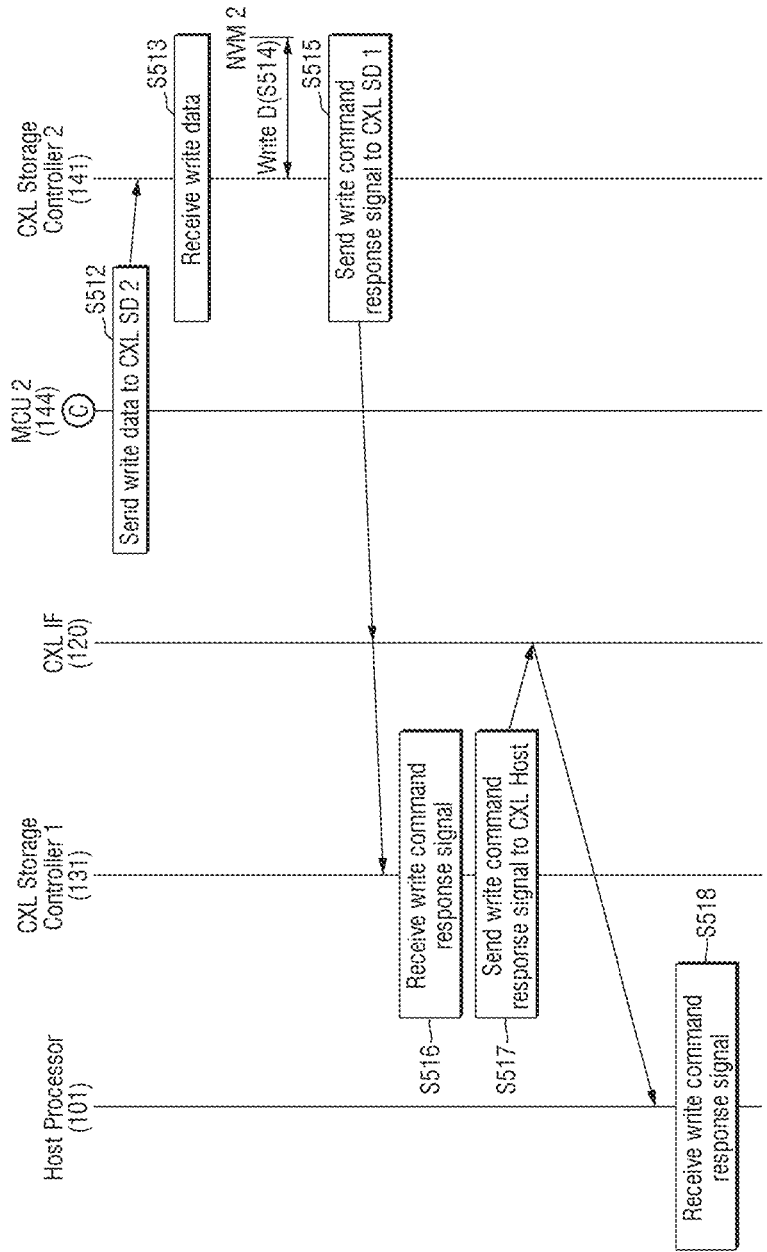
Figure 18:
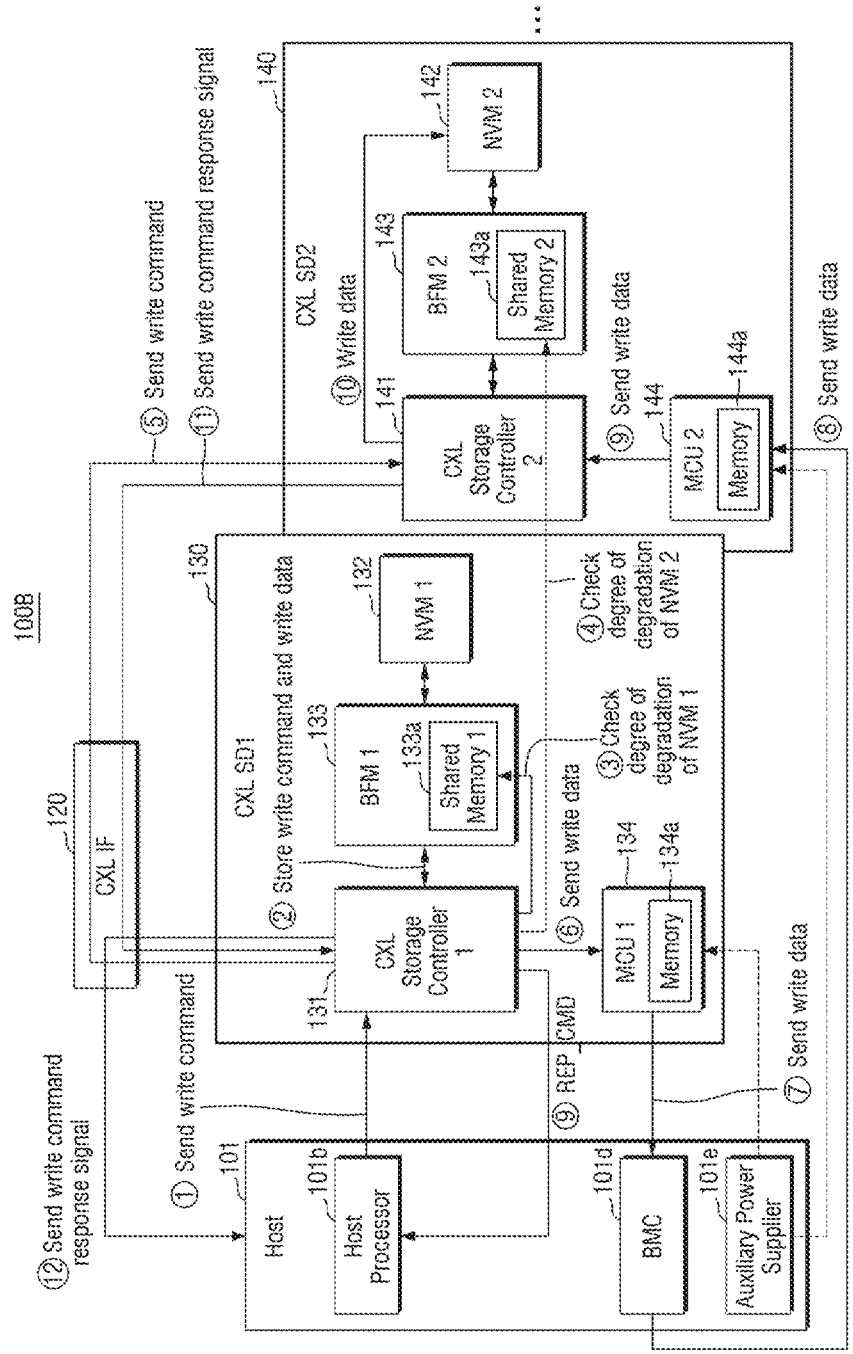
FIG. 18 is an exemplary diagram for explaining the operation of the computing system of FIG. 15.

FIGS. 16 and 17 illustrate the operation of the computing system of FIG. 15. FIG. 18 illustrates the operation of the computing system of FIG. 15. Operation of the computing system according to some embodiments will be described below with reference to FIGS. 16 to 18.

Referring to FIGS. 16 to 18, in operation S500, the host 101 may issue the write command and the write data to the CXL storage device 130 through the CXL host interface circuit 101*a* (shown in FIG. 3). The write command may be sent to the CXL switch within the CXL interface 120, and the CXL interface 120 may send the write command to the CXL storage controller 131 of the CXL storage device 130 which is a target of the write command.

Next, in operations S501, S502, and S503, the CXL storage controller 131 of the CXL storage device 130 may check the degree of degradation of the non-volatile memory 132 through the shared memory 133a, and check the degree of degradation of the non-volatile memory 142 through the shared memory 143a, in response to (or based on) reception of the write command from the CXL interface 120. In the embodiment, the CXL storage controller 131 may access the shared memory 143a of the CXL storage device 140 through the CXL interface 120 to acquire information about the degree of degradation of the non-volatile memory 142.

Next, in operation S504, the CXL storage controller 131 may compare the degree of degradation of the non-volatile memory 132 with the degree of degradation of the non-volatile memory 142. The CXL storage controller 131 may control to write the write data on the non-volatile memory 132 (S505), in response to the fact (or based on identifying) that the degree of degradation of the non-volatile memory 132 is not higher than that of the non-volatile memory 142 (S504, "N"). Alternatively, in operation S506, the CXL storage controller 131 may transmit the write command to the CXL storage device 140 through the CXL interface 120, in response to the fact (or based on identifying) that the degree of degradation of the non-volatile memory 132 is higher than that the degree of degradation of the non-volatile memory 142 (S504, "Y").

Also, the CXL storage controller 131 may transmit the write data to the CXL storage device 140 on the basis of a peer-to-peer (P2P) method, without the control of the host processor 101b. For example, the CXL storage controller 131 may transmit the write data to the MCU 134 in operation S507. In some embodiments, the CXL storage controller 131 may temporarily store the write data in the buffer memory 133 before transmitting the write data to the MCU 134, and then transmit the write data temporarily stored in the buffer memory 133 to the MCU 134.

In some embodiments, after the CXL storage controller 131 initially stores the write data in the non-volatile memory 132 according to a write command, when the degree of degradation of the non-volatile memory 13 gets worse, the CXL storage controller 131 may read the write data from the non-volatile memory 132 and transmit it to the MCU 134 to move the write data to the non-volatile memory 132.

Next, in operations S508 and S509, the MCU 134 may receive the write data and transmit the received write data to the BMC 101d. In the embodiment, the MCU 134 may transmit the write data to the BMC 101d through the out-of-band route without the control of the host processor 101b. FIG. 16 shows that the MCU 134 transmits the write data to the BMC 101d without going through the CXL interface 120, but the embodiments are not limited thereto. In some embodiments, the MCU 134 may transmit the write data to the BMC 101d through the CXL interface 120.

Next, the BMC 101d may receive the write data and transmit the received write data to the MCU 144 in operations S510 and S511. In an embodiment, the transmission of write data from the BMC 101d to the MCU 144 is the same as the transmission of the write data from the MCU 134 to the BMC 101d.

Next, the MCU 134 may transmit the received write data to the CXL storage controller 141, and the CXL storage controller 141 may transmit the received write data on the non-volatile memory 142 through the operations of operations S512 to S514.

In this way, in some embodiments, the CXL storage controller 131 may transmit the write data to the CXL storage device 140 on the basis of the P2P method without the control of the host processor 101b, thereby managing the degree of degradation of the non-volatile memory 132 included in the CXL storage device 130.

Subsequently, in operation S515, after performing the write command received from the CXL storage controller 131, the CXL storage controller 141 may transmit a command response signal notifying completion of the write command to the CXL storage device 130 that transmitted the write command to the CXL storage controller 141. After that, in operations S516 and S517, the CXL storage controller 131 receives the command response signal through the CXL interface 120, and may transmit the command response signal notifying completion of the write command requested by the host 101 to the host 101 that first transmitted the write command to the CXL storage controller 131 through the CXL interface 120. Therefore, the host 101 may finally receive the command response signal through the CXL interface 120 in operation S518.

In this way, the host 101 may receive the write command response signal from the CXL storage device 130 to which the host 101 first transmitted the write command, rather than from the CXL storage device 140 that performed the write command.

Figure 19:
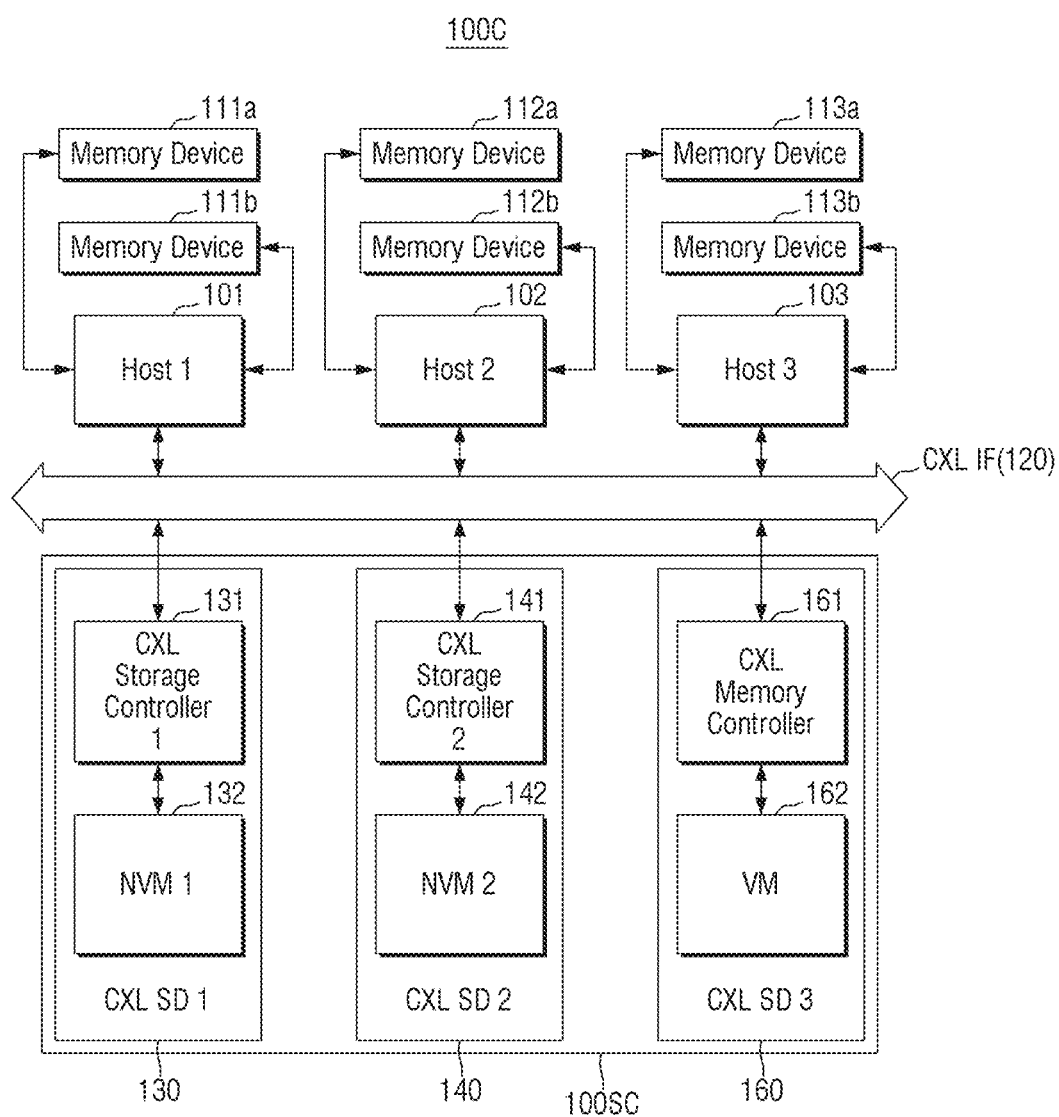
FIG. 19 is an exemplary diagram for describing a computing system according to some other embodiments.
Figure 20:
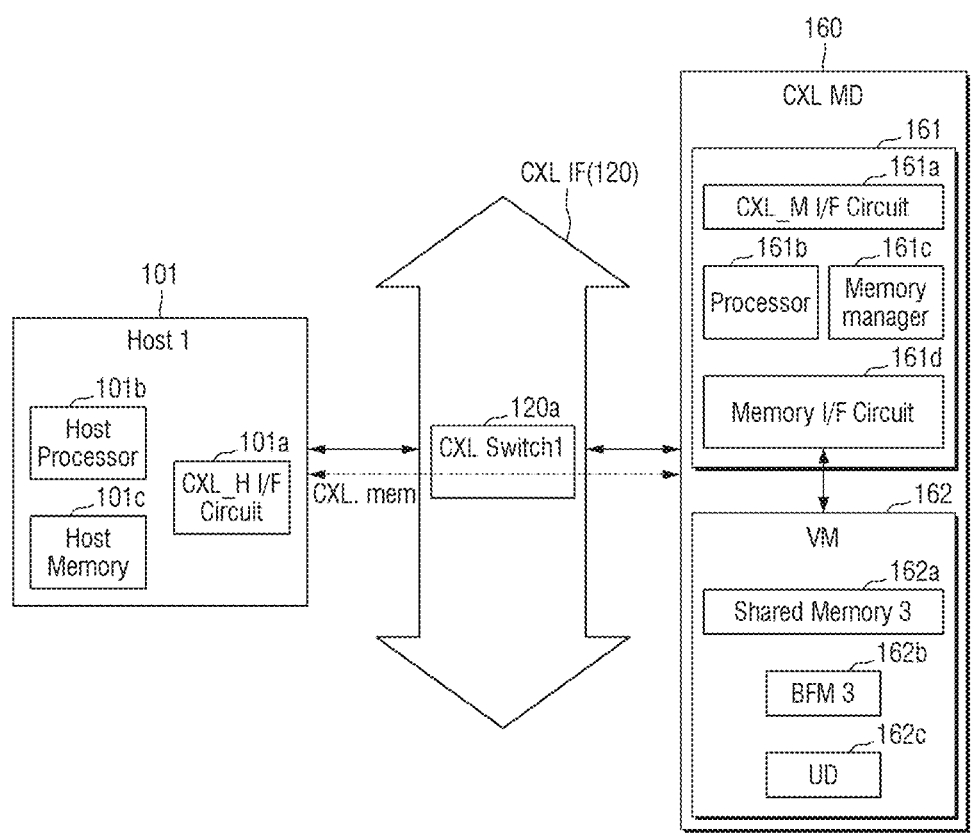
FIG. 20 is an exemplary diagram for describing components of the host and the CXL memory device of FIG. 19 in detail.
Figure 21:
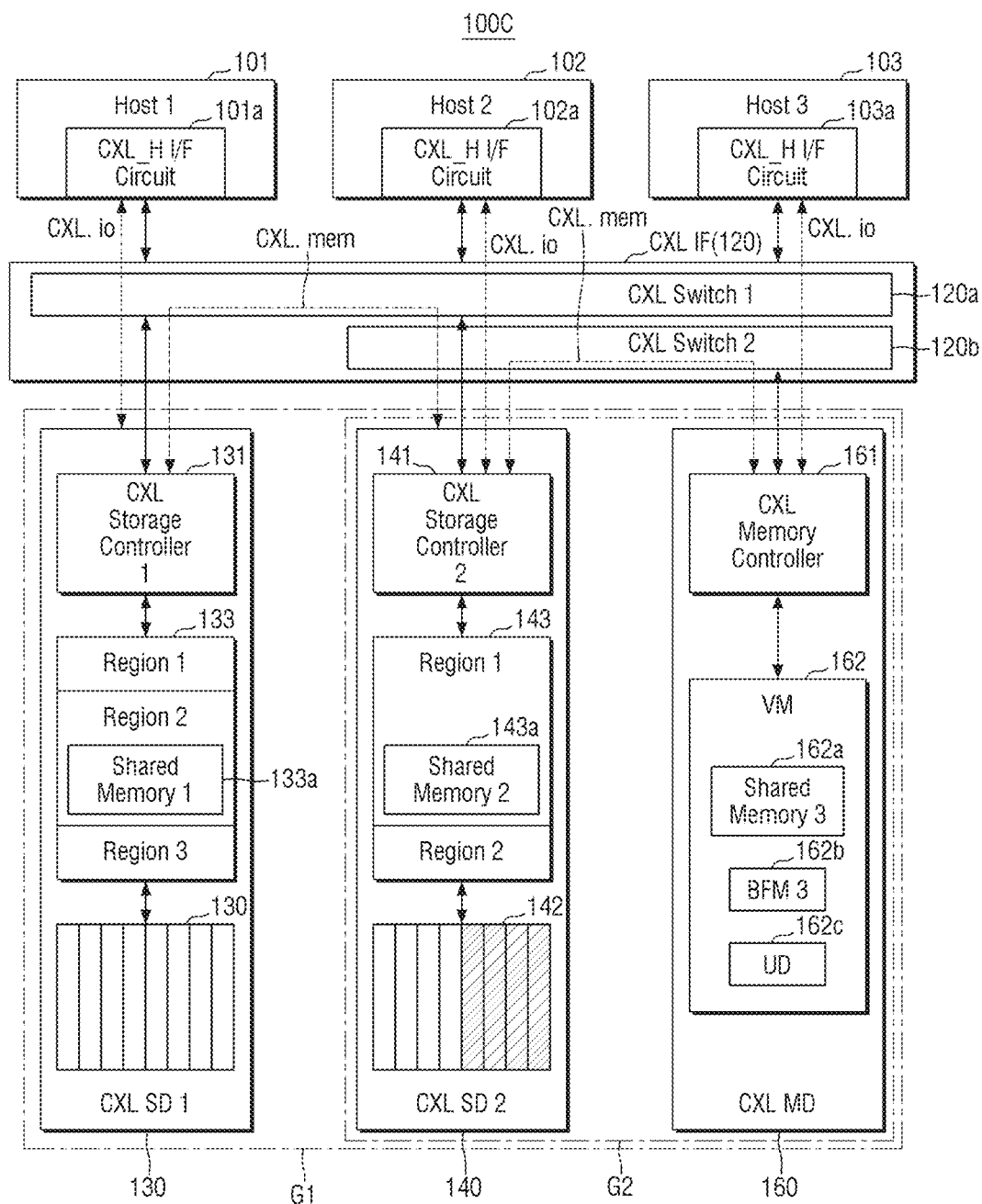
FIG. 21 is an exemplary diagram for explaining the computing system of FIG. 19.

FIG. 19 illustrates a computing system according to some other embodiments. FIG. 20 is an exemplary diagram for describing components of the host and the CXL memory device of FIG. 20 in detail. FIG. 21 illustrates the computing system of FIG. 19. The computing system according to some embodiments will be described below with reference to FIGS. 19 to 21. Hereinafter, repeated descriptions of the previous embodiments will not be provided, and differences will be mainly described.

Referring first to FIGS. 19 and 20, unlike FIGS. 1 and 2, a computing system 100C may include a CXL memory device 160. The CXL memory device 160 may include a CXL memory controller 161 and a volatile memory 162. The host 101 and the CXL memory device 160 may communicate with each other, using CXL.mem. The host 101 and the CXL memory device 160 may send and receive various types of information each other, including the user data 162c, using the CXL.mem. The CXL memory controller 161 may include a CXL memory interface circuit 161d, a processor 161b, a memory manager 161c, and a memory interface circuit 161d.

The CXL memory interface circuit 161a may be connected to the CXL switch 120a. The CXL memory interface circuit 161a may communicate with the host 101 or the CXL storage devices 130 and 140 (shown in FIG. 19) through the CXL switch 120a.

The processor 161b may be configured to control the general operation of the CXL memory controller 161. The memory manager 161c may be configured to manage the buffer memory 162b. The CXL memory interface circuit 161d may control the volatile memory 162 such that data is stored in or read from the volatile memory 162. In some embodiments, the CXL memory interface circuit 161d may be implemented to comply with standards such as a DDR interface and a LPDDR interface.

The volatile memory 162 may include a shared memory 162a and a buffer memory 162b. Also, the volatile memory 162 is made up of a DRAM or the like, and may store the user data 162c. The shared memory 162a may be data stored by monitoring and collecting the status of the volatile memory 162 by the CXL memory controller 161. For example, the shared memory 162a may include information about the degree of degradation of the volatile memory 162. In the computing system 100C, other devices connected to the CXL memory device 160 through the CXL interface 120 may access the shared memory 162a of the CXL memory device 160. In addition, the CXL memory device 160 may access other devices (e.g., the respective shared memories 133a and 143a (shown in FIG. 21) of the CXL storage devices 130 and 140) connected through the CXL interface 120.

Referring to FIG. 21, the CXL storage device ("CXL SD 2") 140 and the CXL memory device ("CXL MD") 160 may be connected together through the CXL switch 120b, and the CXL storage device 140 and the CXL memory device 160 may access each of the shared memories 143a and 162a through the CXL switch 120b. Accordingly, in a case that the host 101 transmits command related to the operation of the non-volatile memory 142 to the CXL storage device 140 and the CXL storage controller 141 fails to process the command on the CXL storage device 140, the CXL storage controller 141 may transmit the command to the CXL memory device 160 connected through the CXL switch 120b, and the CXL memory controller 161 may be controlled to perform the command.

In an embodiment, in a case that the host 101 transmits the command related to the operation of the volatile memory 162 to the CXL memory device 160 and the CXL memory controller 161 fails to process the command on the CXL memory device 160, the CXL memory controller 161 transmits the command to one of the CXL storage devices 130 and 140 connected through the CXL interface 120, and the CXL storage controllers 131 and 141 that received the command may be controlled to perform the command.

Figure 22:
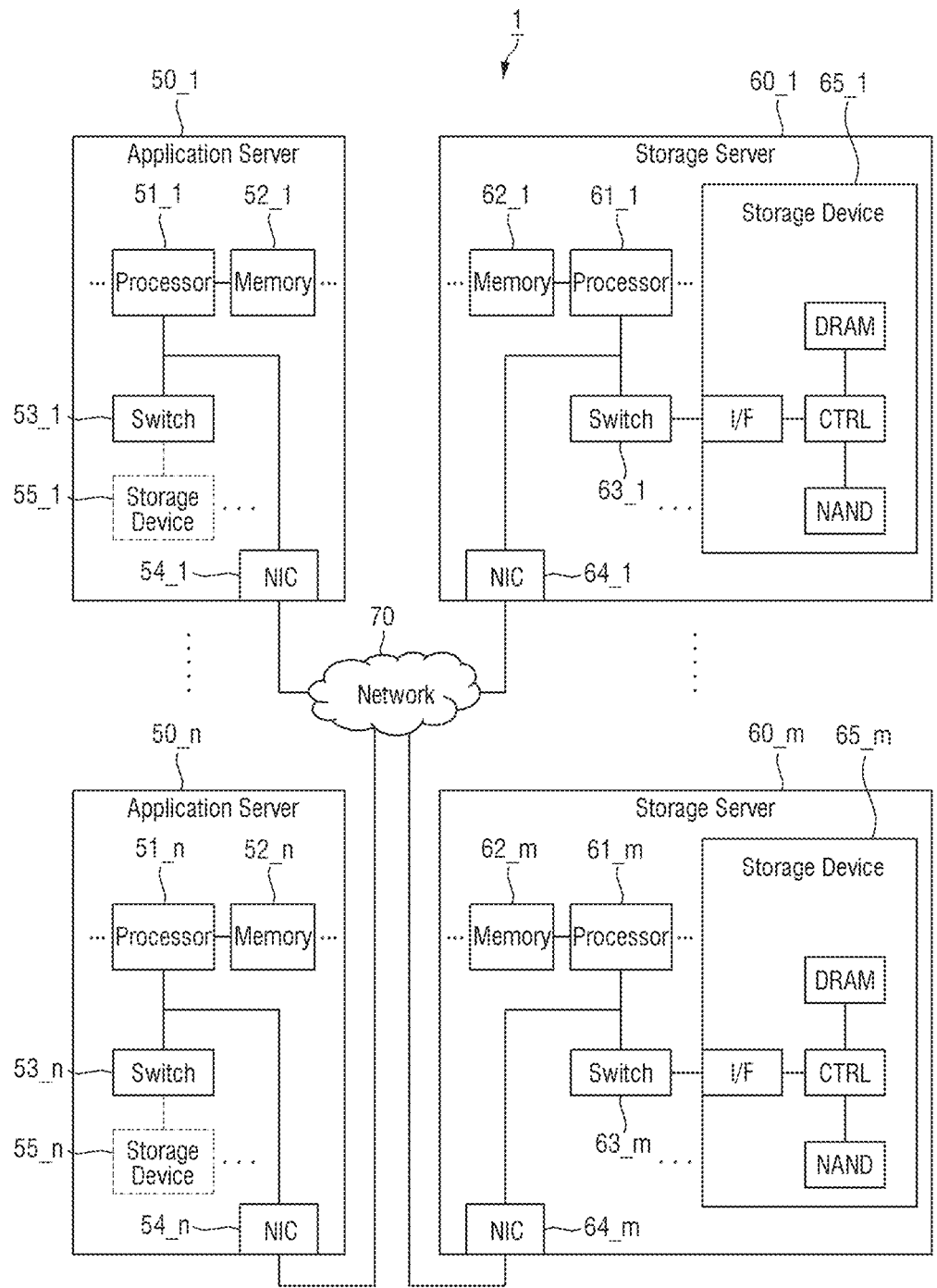
FIG. 22 is an exemplary diagram for explaining a data center to which the computing system according to some embodiments is applied.

FIG. 22 illustrates a data center to which the computing system according to some embodiments is applied.

In some embodiments, the computing system described above with reference to the drawings may be included in the data center 1 as an application server 50_1 and/or a storage server 60_1. Furthermore, the storage system applied to the embodiments of the disclosure may be applied to each of the application server 50_1 and/or the storage server 60_1.

The data center 1 may collect various data and provide service, and may be called a 'data storage center.' For example, the data center 1 may be used as a system for search engine and database operation, or a computing system used by a company such as a bank or a government agency. As shown in FIG. 22, the data center 1 may include application servers 50_1 to 50_n and storage servers 60_1 to 60_m (m and n are integers greater than 1). The number n of the application servers 50_1 to 50_n and the number m of the storage servers 60_1 to 60_m may be variously selected according to the embodiment, and the number n of application servers 50_1 to 50_n may be different from the number m of storage servers 60_1 to 60_m.

The application servers 50_1 to 50_n may include at least one of processors 51_1 to 51_n, memories 52_1 to 52_n, switches 53_1 to 53_n, network interface controllers (NICs) 54_1 to 54_n, and storage devices 55_1 to 55_n. The processors 51_1 to 51_n may control the overall operation of the application servers 50_1 to 50_n, and may access the memories 52_1 to 52_n to execute instructions and/or data loaded into the memories 52_1 to 52_n. As a non-restrictive example, the memories 52_1 to 52_n may include a Double Data Rate Synchronous DRAM (DDR SDRAM), a High Bandwidth Memory (HBM), a Hybrid Memory Cube (HMC), a Dual In-line Memory Module (DIMM), an Optane DIMM or a Non-Volatile DIMM (NVMDIMM).

According to the embodiment, the number of processors and the number of memories included in the application servers 50_1 to 50_n may be variously selected. In some embodiments, the processors 51_1 to 51_n and the memories 52_1 to 52_n may provide a processor-memory pair. In some embodiments, the number of processors 51_1 to 51_n and memories 52_1 to 52_n may be different from each other. The processors 51_1 to 51_n may include a single-core processor or a multi-core processor. In some embodiments, the storage devices 55_1 to 55_n may be omitted in the application servers 50_1 to 50_n, as indicated by the dashed lines in FIG. 22. The number of storage devices 55_1 to 55_n included in the storage servers 55_1 to 55_n may be variously selected according to the embodiment. The processors 51_1 to 51_n, the memories 52_1 to 52_n, the switches 53_1 to 53_n, the NICs 54_1 to 54_n and/or the storage devices 55_1 to 55_n may communicate with each other through the CXL interface and the CXL switch described above with reference to the drawings.

The storage servers 60_1 to 60_m may include at least one of processors 61_1 to 61_m, memories 62_1 to 62_m, switches 63_1 to 63_m, NICs 64_1 to 64_n, and storage devices 65_1 to 65_m. The processors 61_1 to 61_m and the memories 62_1 to 62_m may operate in a manner similar to the processors 51_1 to 51_n and the memories 52_1 to 52_n of the application servers 50_1 to 50_n described above.

The application servers 50_1 to 50_n and the storage servers 60_1 to 60_m may communicate with each other through the network. In some embodiments, the network 70 may be implemented using Fiber Channel (FC), Ethernet, or the like. The FC may be a medium used for relatively high-speed data transmission, and an optical switch that provides high performance/high availability may be used. Depending on the access method of the network 70, the storage servers 60_1 to 60_m may be provided as a file storage, a block storage or an object storage.

In some embodiments, the network 70 may be a storage-only network such as a (SAN). For example, the SAN may utilize an FC network, and may be a FC-SAN implemented according to FC protocol (FCP). Alternatively, the SAN may be an IP-SAN that uses TCP/IP network and is implemented according to a SCSI over TCP/IP or Internet SCSI (iSCSI) protocol. In some embodiments, the network 70 may be a general network such as a TCP/IP network. For example, the network 70 may be implemented according to protocols such as a FC over Ethernet (FCoE), a network attached storage (NAS), and a NVMe over Fabrics (NVMe-oF).

Hereinafter, although the application server 50_1 and the storage server 60_1 will be mainly described, the description of the application server 50_1 is also applicable to the other application server (e.g., 50_n), and the description of the storage server 60_1 is also applicable to the other storage server (e.g., 60_m).

The application server 50_1 may store data requested by a user or a client to store in one of the storage servers 60_1 to 60_m through the network 70. In addition, the application server 50_1 may obtain data requested by the user or client to read from one of the storage servers 60_1 to 60_m through the network 70. For example, the application server 50_1 may be implemented by a Web server, a database management system (DBMS), or the like.

The application server 50_1 may access the memory 52_n and/or the storage device 55_n included in other application servers 50_n through the network 70, and/or may access the memories 62_1 to 62_m and/or the storage devices 65_1 to 65_m included in the storage servers 60_1 to 60_m through the network 70. Accordingly, the application server 50_1 to perform various operations on data stored in the application servers 50_1 to 50_n and/or the storage servers 60_1 to 60_m. For example, the application server 50_1 may execute instructions for moving or copying the data between the application servers 50_1 to 50_n and/or the storage servers 60_1 to 60_m. In the embodiment, the data may be moved from the storage devices 65_1 to 65_m of the storage servers 60_1 to 60_m to the memories 52_1 to 52_n of the application servers 50_1 to 50_n, through the memories 62_1 to 62_m of the storage servers 60_1 to 60_m or directly. In some embodiments, data moving through the network 70 may be data encrypted for security or privacy.

In the storage server 60_1, the interface IF may provide a physical connection between the processor 61_1 and the controller CTRL, and a physical connection between the NIC 64_1 and the controller CTRL. For example, the interface IF may be implemented in a direct attached storage (DAS) type that directly connects the storage device 65_1 with a dedicated cable. Also, for example, the interface IF may be implemented in various interface types, such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), a NVM express (NVMe), an IEEE 1394, a universal serial bus (USB), a secure digital (SD) card, a multi-media card (MMC), an embedded multi-media card (eMMC), a universal flash storage (UFS), an embedded universal flash storage (eUFS), and a compact flash (CF) card interface.

In the storage server 60_1, the switch 63_1 may selectively connect the processor 61_1 and the storage device 65_1 or selectively connect the NIC 64_1 and the storage device 65_1 under the control of the processor 61_1.

In some embodiments, the NIC 64_1 may include a network interface card, a network adapter, or the like. The NIC 54_1 may be connected to the network 70 by a wired interface, a wireless interface, a Bluetooth interface, an optical interface, or the like. The NIC 54_1 may include an internal memory, a DSP, a host bus interface, and the like, and may be connected to the processor 61_1 and/or the switch 63_1 and the like through the host bus interface. In some embodiments, the NIC 64_1 may be integrated with at least one of the processor 61_1, the switch 63_1, and the storage device 65_1.

In the application servers 50_1 to 50_n or the storage servers 60_1 to 60_m, the processors 51_1 to 51_m and 61_1 to 61_n may transmit commands to the storage devices 55_1 to 55_n and 65_1 to 65_m or the memories 52_1 to 52_n and 62_1 to 62_m to program or read the data. In the embodiment, the data may be error-corrected data through an error correction code (ECC) engine. The data may be data subjected to a data bus conversion (DBI) or data masking (DM) process, and may include a cyclic redundancy code (CRC) information. The data may be data encrypted for security or privacy.

The storage devices 55_1 to 55_n and 65_1 to 65_m may transmit the control signal and command/address signal to the non-volatile memory device (e.g., NAND flash memory device) NVM, in response to (or based on) the read commands received from the processors 51_1 to 51_m and 61_1 to 61_n. Therefore, when reading the data from the non-volatile memory device NVM, the read enable signal is input to the data output control signal, and may serve to output data to the DQ bus. A data strobe signal may be generated, using the read enable signal. Command and address signal may be latched according to a rising edge or a falling edge of the write enable signal.

The controller CTRL may generally control the operation of the storage device 65_1. In an embodiment, the controller CTRL may include a static random access memory (SRAM). The controller CTRL may write data on the non-volatile memory device NVM in response to (or based on) the write command, or may read data from the non-volatile memory device NVM in response to (or based on) the read command. For example, the write command and/or the read command may be generated on the basis of the request provided from a host, for example, the processor 61_1 in the storage server 60_1, the processor 61_m in the other storage server 60_m, or the processors 51_1 to 51_n in the application servers 50_1 to 50_n. The buffer BUF may temporarily store (buffer) data to be written to the non-volatile memory device NVM or data read from the non-volatile memory device NVM. In some embodiments, the buffer BUF may include a DRAM. Furthermore, the buffer BUF may store metadata, and the metadata may refer to a user data or data generated by the controller CTRL to manage the non-volatile memory device NVM. The storage device 65_1 may include a secure element (SE) for security or privacy.

While the disclosure has been particularly illustrated and described with reference to exemplary embodiments thereof, it will be understood by those of ordinary skill in the art that various changes in form and detail may be made therein without departing from the spirit and scope of the disclosure as defined by the following claims. The exemplary embodiments should be considered in a descriptive sense only and not for purposes of limitation.

What is claimed is:

1. A storage system comprising:
a first compute express link (CXL) storage device configured to be connected to a host through a CXL interface including a first CXL switch and a second CXL switch; and
a second CXL storage device configured to be connected to the host through the CXL interface,
wherein the first CXL storage device includes:
a first CXL storage controller;
a first non-volatile memory controlled by the first CXL storage controller; and
a first shared memory including first information about a first degree of degradation of the first non-volatile memory,
wherein the second CXL storage device includes:
a second CXL storage controller;
a second non-volatile memory controlled by the second CXL storage controller; and
a second shared memory including second information about a second degree of degradation of the second non-volatile memory, the second shared memory being accessible by the first CXL storage controller through the first CXL switch, and
wherein the first CXL storage controller is configured to:
receive a command related to an operation of the first non-volatile memory from the host, and
control the second CXL storage controller to perform the command without performing the command by the first CXL storage controller, based on identifying that the first degree of degradation is higher than the second degree of degradation,
wherein the first CXL storage controller is further configured to request the host to transmit the command to the second CXL storage device, based on the identifying that the first degree of degradation is higher than the second degree of degradation, and
wherein the degradation comprises a reduced time in a lifetime of a non-volatile memory.

2. The storage system of claim 1, wherein the first CXL storage controller is configured to transmit the command to the second CXL storage device through a first signal, based on identifying that the first degree of degradation is higher than the second degree of degradation, and wherein the first signal includes a buffer address of the host transmitting the command.

3. The storage system of claim 2, wherein the command includes a write command, and wherein the second CXL storage device is configured to receive write data from the host, based on the buffer address of the host transmitting the write command.

4. The storage system of claim 3, wherein the second CXL storage controller is configured to perform the write command and transmit, to the first CXL storage device, a command response signal notifying completion of the write command requested by the host.

5. The storage system of claim 4, wherein the host is configured to transmit a read command to the first CXL storage device, wherein the first CXL storage controller is configured to transmit the read command to the second CXL storage device through a second signal, based on the read command, and wherein the second signal includes the buffer address of the host transmitting the read command.

6. The storage system of claim 1, further comprising:

a third CXL storage device configured to be connected to the host through the second CXL switch, wherein the third CXL storage device includes:
  a third CXL storage controller;
  a third non-volatile memory controlled by the third CXL storage controller; and
  a third shared memory including third information about a third degree of degradation of the third non-volatile memory, the third shared memory being accessible by the first CXL storage controller through the first CXL switch and the second CXL switch, and wherein the third CXL storage device is not connected to the host through the first CXL switch.

7. A storage system comprising:

a first compute express link (CXL) storage device configured to be connected to a host through a CXL interface; and a second CXL storage device configured to be connected to the host through the CXL interface, wherein the first CXL storage device includes:
  a first CXL storage controller;
  a first non-volatile memory controlled by the first CXL storage controller; and
  a first shared memory including first information about a first degree of degradation of the first non-volatile memory, wherein the second CXL storage device includes:
  a second CXL storage controller;
  a second non-volatile memory controlled by the second CXL storage controller; and
  a second shared memory including second information about a second degree of degradation of the second non-volatile memory, the second shared memory being accessible by the first CXL storage controller through the CXL interface, and wherein the first CXL storage controller is configured to:
  receive a command related to an operation of the first non-volatile memory from the host, and
  control the second CXL storage controller to perform the command based on identifying that the command is not processed in the first CXL storage device, wherein the first CXL storage controller is further configured to request the host to transmit the command to the second CXL storage device, based on the identifying that the first degree of degradation is higher than the second degree of degradation, and wherein the degradation comprises a reduced time in a lifetime of a non-volatile memory.

8. The storage system of claim 7, wherein the command includes a write command, and wherein the first CXL storage controller is configured to receive the write command and control the second CXL storage controller to write data requested by the host to the second non-volatile memory, based on identifying that the first degree of degradation is higher than the second degree of degradation.

9. The storage system of claim 8, wherein the command further includes a read command, wherein the first CXL storage controller is configured to transmit the read command to the second CXL storage device through a first signal, based on the read command, and wherein the first signal includes a buffer address of the host requesting the read command.

10. The storage system of claim 7, wherein the command includes a read command, wherein data requested by the host to read is stored in the first non-volatile memory, wherein the first CXL storage device includes a first buffer memory, wherein the second CXL storage device includes a second buffer memory, and wherein the first CXL storage controller is configured to:
  store first data, which is a part of data requested by the host to read, in the first buffer memory, and
  store second data that is a remaining part of data requested by the host to read, in the second buffer memory.

11. The storage system of claim 10, wherein the first CXL storage controller is configured to transmit the read command to the second CXL storage device through a first signal based on the read command, and wherein the first signal includes a buffer address of the host requesting the read command.

12. The storage system of claim 11, wherein the second CXL storage controller is configured to transmit the second data stored in the second buffer memory to the host, based on the buffer address of the host requesting the read command and the read command.

13. The storage system of claim 7, wherein the host includes a host processor, a baseboard management controller (BMC), and an auxiliary power supplier, wherein the first CXL storage device includes a first microcontroller (MCU) configured to communicate independently with the BMC without controlling the host processor, wherein the second CXL storage device includes a second MCU configured to communicate independently with the BMC without controlling the host processor, and wherein the auxiliary power supplier is configured to supply power to each of the first MCU and the second MCU.

14. The storage system of claim 13, wherein the command includes a write command, wherein the host processor is configured to transmit, to the first CXL storage controller, the write command and the write data, and wherein the first CXL storage controller is configured to receive the write command and transmit the write command to the second CXL storage device, based on identifying that the first degree of degradation is higher than the second degree of degradation.

15. The storage system of claim 14, wherein the first CXL storage controller is configured to receive the write data and transmit the write data to the first MCU, based on identifying that the first degree of degradation is higher than the second degree of degradation, and
wherein the first MCU is configured to transmit the received write data to the BMC.

16. The storage system of claim 15, wherein the BMC is configured to transmit the received write data to the second MCU,
wherein the second MCU is configured to transmit the received write data to the second CXL storage controller, and
wherein the second CXL storage controller is configured to receive the write command and the write data, and write the write data on the second non-volatile memory.

17. A computing system comprising:
a host; and
a storage system including a first compute express link (CXL) storage device and a second CXL storage device configured to be connected to the host through a CXL interface,
wherein the first CXL storage device includes:
a first CXL storage controller;
a first non-volatile memory controlled by the first CXL storage controller; and
a first shared memory including first information about a first degree of degradation of the first non-volatile memory,
wherein the second CXL storage device includes:
a second CXL storage controller;
a second non-volatile memory controlled by the second CXL storage controller; and
a second shared memory including second information about a second degree of degradation of the second non-volatile memory, the second shared memory being accessible by the first CXL storage controller through the CXL interface, and
wherein the first CXL storage controller is configured to:
receive a command related to an operation of the first non-volatile memory from the host, and
control the second CXL storage controller to perform the command without performing the command by the first CXL storage controller, based on identifying that the first degree of degradation is higher than the second degree of degradation,
wherein the first CXL storage controller is further configured to request the host to transmit the command to the second CXL storage device, based on the identifying that the first degree of degradation is higher than the second degree of degradation, and
wherein the degradation comprises a reduced time in a lifetime of a non-volatile memory.

18. The computing system of claim 17, wherein the first non-volatile memory includes a first zone namespace (ZNS) including a plurality of first zones,
wherein the second non-volatile memory includes a second ZNS including a plurality of second zones,
wherein the command includes a zone allocation request for at least one of the plurality of first zones of the host, and
wherein the first CXL storage controller is further configured to request the host to transmit the zone allocation request to the second CXL storage device, based on identifying that the first degree of degradation is higher than the second degree of degradation.

19. The computing system of claim 18, wherein the host is configured to transmit the zone allocation request to the second CXL storage device, based on the request received from the first CXL storage device, and
wherein the second CXL storage controller is configured to allocate at least one zone of the plurality of second zones to the host based on the zone allocation request.

* * * * *